(12) United States Patent
Brady et al.

(10) Patent No.: US 7,216,036 B2
(45) Date of Patent: May 8, 2007

(54) INTEGRATED INERTIAL STELLAR ATTITUDE SENSOR

(75) Inventors: Tye M. Brady, Southborough, MA (US); Anthony S. Kourepenis, Acton, MA (US); William F. Wyman, Jr., North Falmouth, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 461 days.

(21) Appl. No.: 10/621,097

(22) Filed: Jul. 16, 2003

(65) Prior Publication Data

US 2004/0098178 A1     May 20, 2004

Related U.S. Application Data

(60) Provisional application No. 60/396,494, filed on Jul. 16, 2002.

(51) Int. Cl.
G01C 21/00    (2006.01)
(52) U.S. Cl. ............................ 701/213; 701/4; 701/222; 244/164; 244/165; 244/171
(58) Field of Classification Search .................. 701/13, 701/4, 222; 244/164, 165, 171
See application file for complete search history.

(56) References Cited

U.S. PATENT DOCUMENTS

| | | | | |
|---|---|---|---|---|
| 5,396,425 A | * | 3/1995 | Carlson | 701/14 |
| 5,745,869 A | * | 4/1998 | van Bezooijen | 701/222 |
| 5,963,166 A | * | 10/1999 | Kamel | 342/357.01 |
| 6,098,929 A | * | 8/2000 | Falbel | 244/171 |
| 6,108,594 A | * | 8/2000 | Didinsky et al. | 701/13 |
| 6,252,578 B1 | * | 6/2001 | Hsieh et al. | 345/611 |
| 6,285,928 B1 | * | 9/2001 | Tilley et al. | 701/13 |
| 6,454,217 B1 | * | 9/2002 | Rodden et al. | 244/164 |
| 6,463,365 B1 | * | 10/2002 | Anagnost et al. | 701/13 |
| 6,577,929 B2 | * | 6/2003 | Johnson et al. | 701/4 |

OTHER PUBLICATIONS

Herbert Kramer, "Observation of the Earth and Its Environment", "published" in 2003 exclusively on-line (updated online in 2003), p. 378.

Sira Electro-Optics, "Space/Star Trackers"; http://www.siraeo.co.uk/sectors.asp?s_id=5&ms_id=1; 2004; pp. 1-3.

* cited by examiner

Primary Examiner—Thomas Black
Assistant Examiner—Marie A Weiskopf
(74) Attorney, Agent, or Firm—Iandiorio & Teska

(57) ABSTRACT

An integrated inertial stellar attitude sensor for an aerospace vehicle includes a star camera system, a gyroscope system, a controller system for synchronously integrating an output of said star camera system and an output of said gyroscope system into a stream of data, and a flight computer responsive to said stream of data for determining from the star camera system output and the gyroscope system output the attitude of the aerospace vehicle.

110 Claims, 19 Drawing Sheets

INTEGRATED INERTIAL STELLAR ATTITUDE SENSOR

RELATED APPLICATIONS

This application claims priority of and is related to U.S. Provisional Patent Application Ser. No. 60/396,494 filed Jul. 16, 2002 entitled INERTIAL STELLAR COMPASS, which is fully incorporated herein by reference.

GOVERNMENT RIGHTS

This invention was made with U.S. Government support under Contract No. JPL Contract 1226271 awarded by the Jet Propulsion Laboratory (JPL) in support of NASA's New Millennium Program. The Government may have certain rights in the subject invention.

FIELD OF THE INVENTION

This invention relates to an integrated inertial stellar attitude sensor for an aerospace vehicle in which a star camera system, a gyroscope system and the outputs therefrom are integrated into a low mass, low power package to obtain accurate celestial attitude knowledge over a wide variety of operating conditions.

BACKGROUND OF THE INVENTION

Conventional systems for attitude determination of aerospace vehicles include star trackers and gyroscopes. Using a star tracker alone to determine attitude has disadvantages. If the spacecraft is undergoing high slew rates, i.e. is moving too fast or tumbling, the star camera field of view (FOV) may be changing too fast, and the star tracker camera may not be able to focus on the FOV. The position of stars and the brightness of stars is therefore blurred and cannot be resolved by the star camera sufficiently to be properly compared to a star catalog of known star patterns. Also, if the star camera system has no prior knowledge of the attitude of the aerospace vehicle, it must rely on use of a "lost-in-space" algorithm, where the star identification process is computationally more intensive because of the lack of base information regarding prior aerospace vehicle attitude. Also, if the Sun, Earth, Moon or other bright stars enter the star camera field-of-view during the imaging process, the camera field-of-view is occluded, i.e. the star pattern is obscured because the intensity of the stars in the star pattern is less than the intensity of the Sun, Earth or Moon. This results in poor resolution and consequent inability to properly match the star pattern in the star camera field-of-view with star patterns in the star catalog.

The use of only a gyroscope for attitude determination has disadvantages as well. Inherent errors associated with gyroscopes as known by those skilled in the art include gyroscope "drift", bias and scale factor errors, which affect the accuracy of the gyroscope output.

Additionally, known systems use a Charge Coupled Device (CCD) imager for the star camera, and conventional gyroscopes. Their size, weight, control electronics, and power requirements of CCDs prohibit their use in small satellite applications. CCDs are also susceptible to radiation damage and conventional gyroscopes suffer from the further disadvantages of size and weight, sensitivity to vibrations, and susceptibility to radiation.

Despite these disadvantages, the combination of a CCD star tracker camera attitude determination system and a separate conventional gyroscope attitude determination system is a widely accepted method of solving the attitude determination problem. The combination of CCD star camera systems and conventional gyroscope systems decreases the effects of image blurring and lack of resolution when the vehicle's attitude rate exceeds the camera's optical tracking limit. It also lessens the effects of occlusion of the star field image caused by the presence of the Sun, Earth or Moon in the camera's field-of-view. This combination accomplishes these goals by relying on the gyroscope output to determine the aerospace vehicle attitude when the star camera is occluded or if the aerospace vehicle is moving too fast or is tumbling. Conversely, the attitude derived from the star camera output may be used to calibrate the gyroscope system errors.

Traditionally both the star camera and gyroscope systems obtain attitude information separately, and each system outputs its attitude information to a spacecraft's flight computer where application-specific software must be created to resolve the two separate attitude inputs. This is a cumbersome, highly power and computationally intensive and expensive process that is prone to error. Also, the star camera system and the gyroscope system are separate from each other structurally, adding weight to the overall aerospace vehicle attitude determination system.

Generally the star camera system and the gyroscope system are each developed and manufactured by different companies, with each system having different hardware and software. When loaded on board an aerospace vehicle, the separate star camera and gyroscope systems require that the spacecraft's flight computer fuse or integrate the data generated by the two systems "externally" or outside of both of these systems, using custom mission-specific software. The software designer is thus required to have detailed knowledge and understanding of each systems' behavior, down to the intricacies of how changes in the systems may occur over time, by reason of temperature variations, or as a consequence of other environmental factors. Integrating each system's outputs in software creates unnecessary design risk because the engineers performing the integration are not the same engineers who designed and best understand each system's hardware. Furthermore, third party integration and lack of insight into the design of each system leads to less than optimum performance. Also, this "external" fusion of gyroscopes and star trackers requires large mass and high power, which prohibits applications in smaller vehicles such as nanosatellites. Spacecraft of less than ten kilograms cannot use traditional gyroscopes and star tracker cameras at all. Moreover, the cost of the separate systems, together with the cost of integrating the two systems externally, is quite expensive.

BRIEF SUMMARY OF THE INVENTION

It is therefore an object of this invention to provide an improved attitude sensor for aerospace vehicles.

It is a further object of this invention to provide an attitude sensor having high accuracy with low power and volume requirements.

It is a further object of this invention to provide a more robust, less expensive attitude sensor.

It is a further object of this invention to provide an attitude sensor applicable to a wide range of flight maneuvers and conditions.

It is a further object of this invention to provide an attitude sensor that synchronously integrates the outputs of a star camera system and a gyroscope system without involving the host spacecraft computer.

It is a further object of this invention to provide an attitude sensor that is self-initializing.

It is a further object of this invention to provide an attitude sensor that can identify error trends in the aerospace vehicle attitude.

The invention results from the realization that an improved, less expensive, lightweight, accurate attitude sensor for an aerospace vehicle requiring less power and mass can be achieved by an integrated inertial stellar attitude sensor including a controller system for synchronously integrating the attitude output of a star camera system with the attitude output of a gyroscope system to provide the real-time attitude of the aerospace vehicle.

This invention features an integrated inertial stellar attitude sensor for an aerospace vehicle including a star camera system, a gyroscope system, a controller system for synchronously integrating an output of the star camera system and an output of said gyroscope system into a stream of data, and a flight computer responsive to the stream of data for determining from the star camera system output and the gyroscope system output the attitude of the aerospace vehicle. The output of the star camera system may be a star camera attitude, and the output of the gyroscope system may be a gyroscope attitude. The star camera system may include an active pixel sensor (APS) star camera for acquiring a star field image, and may include a star camera analog-to-digital converter structured and arranged to convert the star field image to a digital representation of star location and intensity. The gyroscope system may include a micro-electromechanical (MEMs) gyroscope system structured and arranged to acquire gyroscope angular rate data, and may include a gyroscope analog-to-digital converter for converting the gyroscope angular rate data to a digital representation of gyroscope angular rate, which may include gyroscope system reference, angular rate and temperature. In one example, the MEMs gyroscope system may be a three axis gyroscope system, including a first axis sensor for sensing angular rate along a first axis, a second axis sensor for sensing angular rate along a second axis, and a third axis sensor for sensing angular rate along a third axis. The MEMs gyroscope system may further include a first application specific integrated circuit (ASIC) associated with the first axis sensor for outputting a first signal, a second application specific integrated circuit (ASIC) associated with the second axis sensor for outputting a second signal, and a third application specific integrated circuit (ASIC) associated with the third axis sensor for outputting a third signal. The first, second and third signals may be output to the gyroscope analog-to-digital converter if included, or they may be output directly to the controller system. The controller system may include a field programmable gate array, and the field programmable gate array may include a command circuit for selectively synchronously integrating the outputs of the gyroscope system and the star camera system in a predetermined pattern to isolate from each other each of their outputs during their integrating.

The command circuit may include a programmable logic device for implementing the selective synchronous integration of the outputs of the gyroscope system and the star camera system in a predetermined pattern. The command circuit may also include at least one camera register for setting star camera rate of image acquisition and star camera power, and a camera control device responsive to the camera register settings for controlling the star camera. The command circuit may further include at least one gyroscope register for setting gyroscope power and a gyroscope reference, and a gyroscope control device responsive to the gyroscope register settings for controlling the gyroscope. The command circuit may also include a data stream packer for interleaving the output of the star camera system and the output of the gyroscope system into the stream of digital data. The gyroscope control device may control when the gyroscope system may receive gyroscope data.

The command circuit may also include a power isolation and control circuit, and the power isolation and control circuit may include a power isolator for isolating star camera power from gyroscope power. At least one gyroscope register may set when the power isolation circuit may receive a signal to transmit gyroscope power to the gyroscope system.

The flight computer may include a star camera system processor, and the star camera system processor may include a camera memory for storing the star field image. The star camera system processor may further include an image processor. The image processor may also include a camera reader for reading the stored star field image, and a camera processor for generating star positions from the read star field image. The image processor may include a star catalog, and a camera comparator for comparing the generated star positions to a star catalog. A camera attitude generator, responsive to an output from the camera comparator, generates a star camera attitude. The camera processor may include a converter for converting the attitude of the aerospace vehicle to an initial star position.

The flight computer may include a gyroscope system processor, and the gyroscope system processor may include a gyroscope memory for storing the gyroscope angular rate data. The gyroscope system processor may include a gyroscope rate processor that includes a gyroscope data reader for reading the stored gyroscope angular rate data. The gyroscope rate processor may further include a gyroscope compensator for processing gyroscope angular rate data and generating a compensated gyroscope rate, and a gyroscope integrator for integrating the compensated gyroscope rate and generating a gyroscope attitude.

The flight computer may further include an attitude processor for receiving and processing the star camera attitude and the gyroscope attitude. The attitude processor may include an aerospace vehicle attitude propagator for propagating the attitude of the aerospace vehicle, and the attitude processor may provide the attitude of the aerospace vehicle in quaternion coordinates. The attitude processor may include an error estimator for estimating aerospace vehicle attitude error, and the attitude propagator and the error estimator may be implemented by a predictive filter. The predictive filter may be a Kalman Filter, particularly, a square root 27 Kalman Filter and/or a state Kalman Filter, and the attitude processor may include a gyroscope attitude gating device for preventing the attitude processor from receiving the gyroscope attitude upon power up of the integrated inertial stellar attitude sensor.

Additionally, the flight computer may include a command control data interface. The command control data interface may include a serial port for reformatting a signal representing the attitude of the aerospace vehicle and a signal representing the aerospace vehicle attitude error signal. The command control data interface may include a counter for counting the number of times the attitude of the aerospace vehicle has been propagated, and a command processor for distributing commands based on command type. The controller system may include an isolation circuit for isolating the stream of data, which may be digital data, from commands distributed by the command processor.

The flight computer may further include a self-scoring system to identify error trends in the aerospace vehicle attitude, and the self-scoring system may include an enabler for enabling the self-scoring system and generating a self-score continuous frequency command to the command control data interface to increase the star camera rate of star field image acquisition to continuous frequency. The self-scoring system may include a first comparator for comparing a continuous frequency star camera attitude over time with the attitude of the aerospace vehicle over time to provide a self-score error output. The self-scoring system may further include a second comparator for comparing the self-score error output to a desired error threshold value and providing a threshold departure output, and an error processor that outputs a self-score command to the command control data interface to increase the frequency of star field image acquisition.

The attitude processor may include a star camera self-initializing device for providing the attitude of the aerospace vehicle to the image processor, and a gyroscope self-initializing device for providing the star camera attitude to the aerospace vehicle attitude propagator.

This invention also features an integrated inertial stellar attitude sensor for an aerospace vehicle including a star camera system, a gyroscope system, a controller system for synchronously integrating an attitude output of the star camera system and an attitude output of the gyroscope system into a stream of data, and a flight computer responsive to the stream of data for determining from the star camera attitude output and the gyroscope system attitude output the attitude of the aerospace vehicle.

This invention further features an inertial stellar attitude determination sensor for an aerospace vehicle including a star camera system including an active pixel sensor star camera, a gyroscope system including a micro-electromechanical gyroscope, a controller system for synchronously integrating an output of the star camera and an output of the micro-electromechanical gyroscope into a stream of digital data, and a flight computer responsive to said stream of digital data for determining from the APS star camera output and the MEMs gyroscope output the attitude of the aerospace vehicle.

This invention further features an inertial stellar attitude determination sensor for an aerospace vehicle including a star camera system including an active pixel sensor star camera, a gyroscope system including a micro-electromechanical gyroscope, and a controller system for synchronously integrating an output of the active pixel sensor star camera and an output of the gyroscope into a stream of data.

This invention also features an inertial stellar attitude determination sensor for an aerospace vehicle including an active pixel sensor star camera, a micro-electromechanical gyroscope integral with the active pixel star camera, a controller system integral with the active pixel star camera and the micro-electromechanical gyroscope for synchronously integrating an attitude output of the active pixel star camera and an attitude output of the micro-electromechanical gyroscope into a stream of data, and a flight computer responsive to the stream of data for determining from the active pixel star camera attitude output and the micro-electromechanical gyroscope attitude output the attitude of the aerospace vehicle.

In addition, this invention features an integrated inertial stellar attitude sensor for an aerospace vehicle including a star camera system, a gyroscope system, a controller system for synchronously integrating an output of the star camera system and an output of the gyroscope system into a stream of data, a flight computer responsive to the stream of data for determining from the star camera output and the gyroscope output the attitude of the aerospace vehicle, and a single housing disposed about the star camera system, the gyroscope system, the controller system and the flight computer.

This invention further features an integrated stellar attitude sensor for an aerospace vehicle including a star camera system, a gyroscope system, a controller system for synchronously integrating an output of said star camera system and an output of the gyroscope system into a stream of data and a single housing disposed about the star camera system, the gyroscope system and controller system.

This invention also features an integrated inertial stellar attitude sensor for an aerospace vehicle including a camera/gyroscope assembly that includes a star camera system, a gyroscope system, and a controller system for synchronously integrating an output of said star camera system and an output of said gyroscope system into a stream of data; as well as a flight computer responsive to the stream of data for determining from the star camera output and the gyroscope output the attitude of the aerospace vehicle. The integrated inertial stellar attitude sensor may also include a first housing disposed about the camera/gyroscope assembly, a second housing disposed about the flight computer, and a third housing disposed about the first and second housings.

This invention further features an integrated inertial stellar attitude sensor for an aerospace vehicle including a star camera system, a gyroscope system, a controller system for synchronously integrating an output of the star camera system and an output of the gyroscope system into a stream of data, a flight computer responsive to the stream of data for determining from the star camera output and the gyroscope output the attitude of the aerospace vehicle, and including a first housing disposed about the star camera system and the gyroscope system, a second housing disposed about the controller and the flight computer, and a third housing disposed about the first and second housings.

Additionally, this invention features an inertial stellar attitude determination sensor for an aerospace vehicle including an active pixel sensor (APS) star camera, a micro-electromechanical (MEMs) gyroscope, a controller system for synchronously integrating the output of the APS star camera and the output of the micro-electromechanical MEMs gyroscope into a stream of data, a flight computer responsive to said stream of data for determining from the APS star camera output and the MEMs gyroscope output the attitude of the aerospace vehicle, and a housing disposed about the APS star camera and the MEMs gyroscope and the flight computer.

Also, this invention features an integrated inertial stellar attitude sensor for an aerospace vehicle including a star camera system, a gyroscope system, a controller system for selectively synchronously integrating an output of the star camera system and an output of the gyroscope system in a predetermined pattern into a stream of data, the controller system including a command circuit for isolating from each other each of the star camera system output and the gyroscope system output during their integrating, and a flight computer responsive to said stream of data for determining from the star camera output and the gyroscope output the attitude of the aerospace vehicle.

This invention further features an integrated inertial stellar attitude sensor for an aerospace vehicle including a star camera system, a gyroscope system, a controller system for synchronously integrating an output of the star camera system and an output of the gyroscope system into a stream of data, the controller system including a data stream packer for interleaving the output of the star camera system and the output of the gyroscope system into the stream of data, and a flight computer responsive to the stream of data for determining from the star camera output and the gyroscope output the attitude of the aerospace vehicle.

This invention also features an integrated inertial stellar attitude sensor for an aerospace vehicle including a star camera system, a gyroscope system, a controller system for synchronously integrating an output of the star camera system and an output of the gyroscope system into a stream of data, and a flight computer responsive to the stream of data for determining from the star camera output and the gyroscope output the attitude of the aerospace vehicle, the flight computer including a star camera self-initializing device for self-initializing the star camera system with the attitude of the aerospace vehicle.

This invention further features an integrated inertial stellar attitude sensor for an aerospace vehicle including a star camera system, a gyroscope system, a controller system for synchronously integrating an output of the star camera system and an output of the gyroscope system into a stream of data, and a flight computer responsive to the stream of data for determining from the star camera output and the gyroscope output the attitude of the aerospace vehicle, the flight computer further including a self-scoring system to identify error trends in the aerospace vehicle attitude.

This invention also features an integrated inertial stellar attitude sensor for an aerospace vehicle including a star camera system, a gyroscope system and a controller system for synchronously integrating an output of the star camera system and an output of said gyroscope system into a stream of data adapted for input to a flight computer to determine the attitude of the aerospace vehicle.

Additionally, this invention features a method of inertial stellar attitude sensing for an aerospace vehicle including the steps of acquiring an image of a star field output from a star camera system, acquiring an angular rate output from a gyroscope system, and selectively, synchronously integrating in a predetermined pattern the image of a star field and the gyroscope angular rate output into a stream of data. The method also includes the steps of converting the data representative of the star field to a star field image to determined the star camera attitude of the vehicle, converting the data representative of the angular rate output to determined the gyroscope attitude of the vehicle, and resolving the star camera attitude with the gyroscope attitude to generate an attitude of the aerospace vehicle. The star camera system may include an active pixel sensor (APS) camera, and the gyroscope system may include a micro-electromechanical (MEMs) gyroscope system, which may be a three axis system. The method may further include the steps of selectively synchronously integrating the outputs of the gyroscope system and the star camera system in a predetermined pattern to isolate from each other each of the star camera system and gyroscope system outputs during their integrating, and resolving the star camera attitude with the gyroscope attitude and submitting them to an attitude processor to obtain the aerospace vehicle attitude. The method may further include the steps of applying the attitude of the aerospace vehicle to self-initialize the star camera attitude, and applying the star camera attitude to self-initialize the gyroscope system attitude. The method may also include the steps of increasing the frequency of star field image acquisition to continuous frequency and determining continuous frequency attitude outputs over time, and comparing the attitude output of the aerospace vehicle over time to the continuous frequency attitude output over time to identify error trends in the aerospace vehicle attitude.

This invention further features a method of inertial stellar attitude sensing for an aerospace vehicle including the steps of acquiring a star camera attitude from a star camera system, acquiring a gyroscope from a gyroscope system, selectively, synchronously integrating in a predetermined pattern the star camera attitude and the gyroscope attitude into a stream of digital data, and resolving the star camera attitude with the gyroscope attitude to generate an attitude for the aerospace vehicle.

This invention also features a method of inertial stellar attitude sensing for an aerospace vehicle including the steps of acquiring an image of a star field output from a star camera system, acquiring an angular rate output from a gyroscope system, selectively, synchronously integrating in a predetermined pattern the image of a star field and the gyroscope angular rate into a stream of data, converting the data representative of the star field within the stream to a star field image to determine the star camera attitude of the vehicle, and converting the digital data representative of the angular rate within the stream to determine the gyroscope attitude of the vehicle. The method further includes the steps of resolving the star camera attitude with the gyroscope attitude to generate an attitude for the aerospace vehicle, and increasing the frequency of star field image acquisition to continuous frequency and determining continuous frequency star camera attitude outputs over time, and comparing the attitude output of the aerospace vehicle over time to the continuous frequency attitude output of the star camera system over time to identify error trends in the aerospace vehicle attitude.

This invention further features a method of inertial stellar attitude sensing for an aerospace vehicle including the steps of acquiring an image of a star field output from a star camera system, acquiring an angular rate output from a gyroscope system, selectively, synchronously integrating in a predetermined pattern the image of a star field and the gyroscope angular rate into a stream of data, converting the data representative of the star field within the stream to a star field image to determine the star camera attitude of the vehicle, and converting the digital data representative of the angular rate within the stream to determine the gyroscope attitude of the vehicle. The method further includes the steps of resolving the star camera attitude with the gyroscope attitude to generate an attitude for the aerospace vehicle, and changing the predetermined pattern of selectively synchronously integrating.

This invention also features a method of inertial stellar attitude sensing for an aerospace vehicle including the steps of acquiring an image of a star field from a star camera, processing the image to provide a camera quaternion, acquiring an angular rate output from an angular rate gyroscope, processing the angular rate output to provide a gyroscope quaternion, and resolving the gyroscope quaternion and the camera quaternion to provide an attitude quaternion for the aerospace vehicle.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
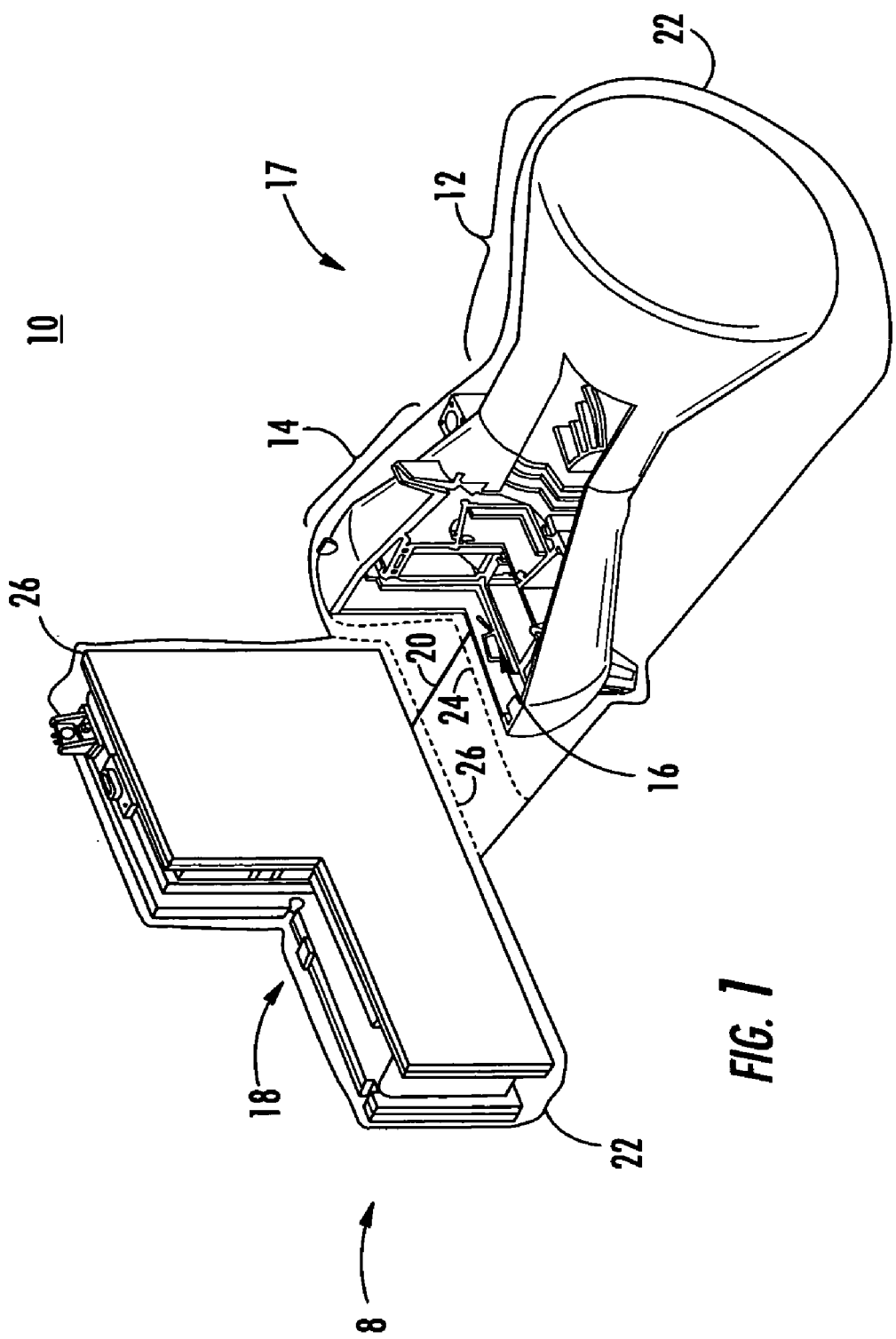
FIG. 1 is a schematic three-dimensional exploded view of one embodiment of the integrated inertial stellar attitude sensor for an aerospace vehicle of the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

An integrated inertial stellar attitude sensor 8 for an aerospace vehicle 10 of one embodiment of this invention includes star camera system 12, gyroscope system 14, controller system 16 and data processing assembly or flight computer 18. Collectively, star camera system 12, gyroscope system 14 and controller system 16 may be referred to as camera/gyroscope assembly 17, which may be connected to flight computer 18 by connector 20. Connector 20 may be any appropriate connector known in the art including cable connections providing a serial link. Housing 22 may be disposed about integrated inertial stellar attitude sensor 8. Additional housing 24 may be disposed about camera/gyroscope assembly 17 and additional housing 26 may be disposed about flight computer 18. Housings 24 and 26 may or may not be within housing 22. Housings 22, 24, 26 may be any suitable shape. Star camera system 12, gyroscope system 14, and controller 16 may be used with a data processor or flight computer other than flight computer 18 of this invention. In contrast to conventional attitude systems discussed in the background section above, integrated inertial stellar attitude sensor 8 meets compact onboard space requirements, low power requirements, is less expensive to manufacture and is more reliable. These advantages may be particularly useful on small aerospace vehicles such as nanosatellites.

Figure 2:
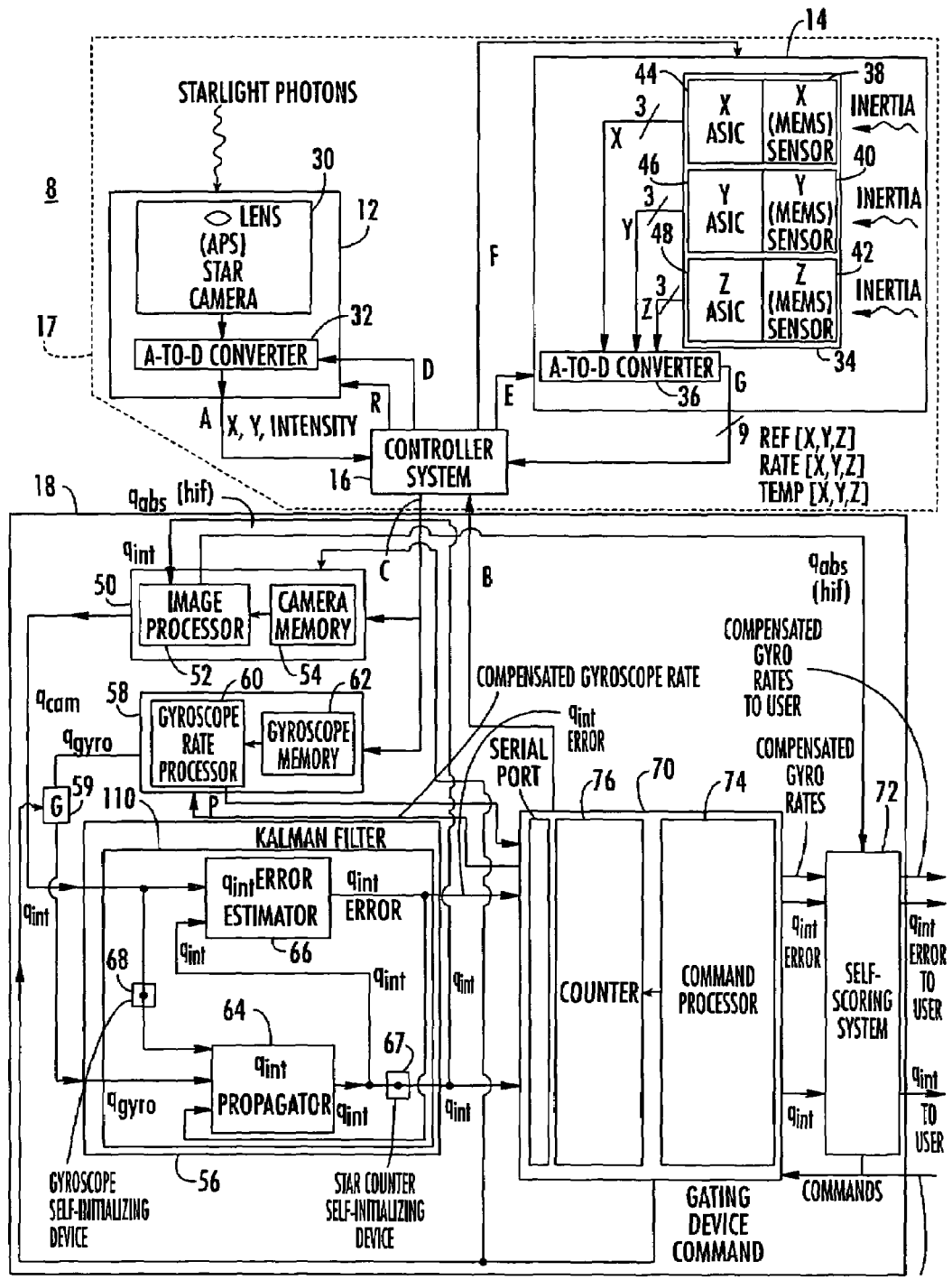
FIG. 2 is a more detailed schematic block diagram of the star camera system, gyroscope system and flight computer of FIG. 1.

Star camera system 12, FIG. 2, of integrated inertial stellar attitude sensor 8 includes star camera 30 for acquiring a star field image which typically includes all stars in the field-of-view of star camera 30. While conventional star cameras are known in the art and often include CCDs, one embodiment of the present invention features an active pixel sensor (APS) star camera. Active pixel sensors are arrays of photosensors, each with a local amplifier and row and column addressing capability. Size and weight of the camera system can be reduced significantly, as compared to CCD based camera systems, because the required control and driving circuitry electronics for an APS star camera is less than for CCDs. Active pixel sensors may integrate analog and digital functions on the same die or chip. Also, compared to the highly capacitive CCD, power can be reduced using active pixel sensors since active pixel sensors typically use standard 5-Vdc and 3.3-Vdc power supplies. Moreover, active pixel sensors are radiation tolerant, since they can be manufactured with processes such as silicon-on-insulator, and since active pixel sensors are not sensitive to charge transfer efficiency effects commonly associated with radiation-damaged CCDs.

A star field image, including x and y location coordinates and intensity for each star location in the star field image, is represented by output A of star camera system 12. Star camera system 12 may include star camera analog-to-digital converter 32 for converting the star field image from star camera 30 to a digital representation of star location and intensity. Those skilled in the art will recognize that the output A of star camera system 12 is not limited to a star field image, but may include star camera attitude or a camera quaternion. As described more fully below, controller system 16 synchronously integrates star camera system output A into stream of data C, which may be a digital data stream.

With respect to the gyroscope system, it is known that conventional gyroscope systems may be one-, two-, or three-axis gyroscope systems. Although gyroscope system 14 of this invention may be comprised of such a conventional gyroscope system, one embodiment of this invention features micro-mechanical or micro-electromechanical (MEMs) gyroscope system 34 which is a three-axis gyroscope system that may include gyroscope analog-to-digital converter 36. The structure and function of MEMs gyroscope systems suitable for use with the subject invention are described in U.S. Pat. Nos. 5,635,639, 5,760,305, 5,767,405, and 5,349,855 as well as U.S. patent application Ser. No.

10/264,887 and PCT patent application WO 03/031912A2, each of which is hereby incorporated herein in its entirety by reference.

MEMs gyroscope system 34 includes first axis sensor 38, second axis sensor 40, and third axis sensor 42. Typically, first axis sensor 38 is associated with the x-axis, second axis sensor 40 is associated with the y-axis, and third axis sensor 42 is associated with the z-axis. First application specific integrated circuit (ASIC) 44 is associated with first axis sensor 38. Second application specific integrated circuit (ASIC) 46 is associated with second axis sensor 40, and third application specific circuit (ASIC) 48 is associated with third axis sensor 42.

MEMs gyroscope system 34 acquires gyroscope angular rate data. Particularly, first, second and third axis sensors 38, 40 and 42 sense inertia in the x, y and z directions respectively. First, second and third ASICs 44, 46 and 48 convert the mechanical movement of axis sensors 38, 40 and 42 into electrical signals X, Y and Z representing gyroscope angular rate data which may include system reference, angular rate and temperature data for each axis. Gyroscope system 34 may include gyroscope analog-to-digital converter 36 for converting the gyroscope angular rate data to digital representation of gyroscope angular rate. Signals X, Y, Z are output to the gyroscope analog-to-digital converter if included, or X, Y, and Z may be output directly to controller system 16. Those skilled in the art will recognize that the output G of gyroscope system 14 is not limited to angular rate, but may include gyroscope attitude or a gyroscope quaternion. As described more fully below, controller system 16 synchronously integrates gyroscope system output G into stream of data C as an output of the controller.

In contrast to conventional attitude sensors, controller system 16 synchronously integrates gyroscope system output G and star camera system output A into stream of data C. The stream of data C may be digital, however, alternative data formats may be appropriate including analog and optical systems. Data processing assembly or flight computer 18 is responsive to the stream of data C that includes the synchronously integrated gyroscope system and star camera system outputs A and G. Flight computer 18 is separate from, and should not be confused with, the host spacecraft or the aerospace vehicle computer. Flight computer 18 is part of the integrated inertial stellar attitude sensor of this invention that includes star camera system 12 and gyroscope system 14. Flight computer 18 determines the attitude of the aerospace vehicle $q_{int}$ from the star camera output system and the gyroscope system output. The attitude of the aerospace vehicle $q_{int}$ determined by flight computer 18 may be in quaternion coordinates, where $q_{int}$ is the aerospace vehicle attitude quaternion. Those skilled in the art will recognize quaternion coordinates and other coordinates as an appropriate data format to represent and/or communicate the vehicle attitude.

Before a detailed explanation of the operation of particular components of flight computer 18 is presented, an overview of flight computer 18 will be provided. Although specific components of flight computer 18 are shown and discussed, it will be understood by those skilled in the art that such components are not to be taken as the only possible components, and that flight computer 18 may be a central processing unit, of which the components described herein are a part, and that components or combinations of components may be implemented in software or hardware in various combinations.

Figure 6:
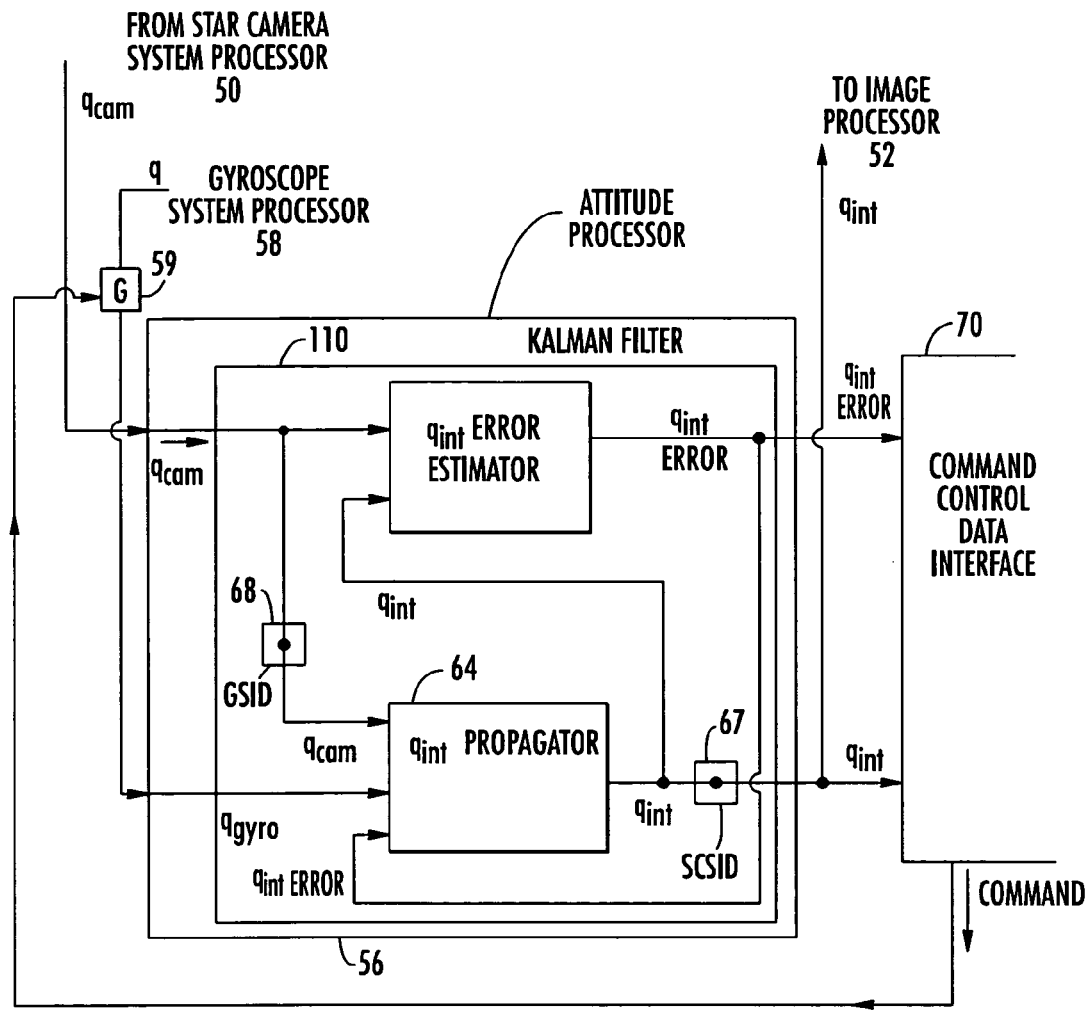
FIG. 6 is an enlarged more detailed view of the attitude processor of FIG. 2.

Typically flight computer 18 includes star camera system processor 50 and image processor 52 for processing the camera data which as noted above may include the star field image as a digital representation of star location and intensity. Star camera system processor 50 may include camera memory 54 for storing the camera data. Star camera system processor 50 generates a star camera attitude $q_{cam}$. The star camera attitude $q_{cam}$, is output to attitude processor 56 as shown in FIG. 6. The star camera attitude $q_{cam}$ may be in quaternion coordinates, where $q_{cam}$ is the star camera attitude quaternion, or other appropriate coordinate frame or data format as are known in the art.

In one design flight computer 18 includes gyroscope system processor 58, and gyroscope rate processor 60 for processing the gyroscope angular rate data. For conventional gyroscopes, the gyroscope angular rate data includes a digital representation of gyroscope system reference. For the MEMs gyroscope 34, the gyroscope angular data includes a representation of reference, rate and temperature for all three axes, which may be digital. Gyroscope system processor 58 may include gyroscope memory 62 for storing the gyroscope angular rate. Gyroscope system processor 58 generates a gyroscope attitude $q_{gyro}$ which is output to attitude processor 56, except when gyroscope attitude gating device 59 is open. When gyroscope attitude gating device 59 is open it prevents $q_{gyro}$ from proceeding to attitude processor 56. Gyroscope attitude gating device 59 is open upon power up of the integrated inertial stellar attitude sensor of this invention, i.e. when N=1, where N is the number of times data has been processed through the sensor of this invention. Gyroscope attitude $q_{gyro}$ may be in quatrain coordinates, or other appropriate coordinate frames or data formats.

Attitude processor 56 receives and processes star camera attitude $q_{cam}$ and gyroscope attitude $q_{gyro}$, and includes aerospace vehicle attitude propagator 64 for propagating the attitude of the aerospace vehicle $q_{int}$, and error estimator 66 for estimating aerospace vehicle attitude error $q_{int\ error}$. Collectively, attitude propagator 64 and error estimator 66 form a predictive filter 110, which may be a Kalman Filter or other appropriate filter, estimator or propagator as are known in the art.

Attitude processor 56 preferably includes star camera self-initializing device 67 for providing the attitude of the aerospace vehicle $q_{int}$ to image processor 52. Gyroscope self-initializing device 68 provides star camera attitude $q_{cam}$ to aerospace vehicle attitude propagator 64 to correct for gyroscope errors including drift, scale factor and bias errors.

In one embodiment flight computer 18 also includes command control data interface 70 and self-scoring system 72. Command control data interface 70 receives, sorts, and outputs commands and data, and interfaces with self-scoring system 72, controller system 16, star camera system processor 50, attitude processor 56, gyroscope rate processor 60, image processor 52, and the user. The user may be a computer on the host spacecraft or the person controlling the host spacecraft. Command control data interface 70 typically includes a command processor 74 for distributing commands and counter 76 for counting the number of times the attitude of the aerospace vehicle $q_{int}$ has been propagated.

Figure 3:
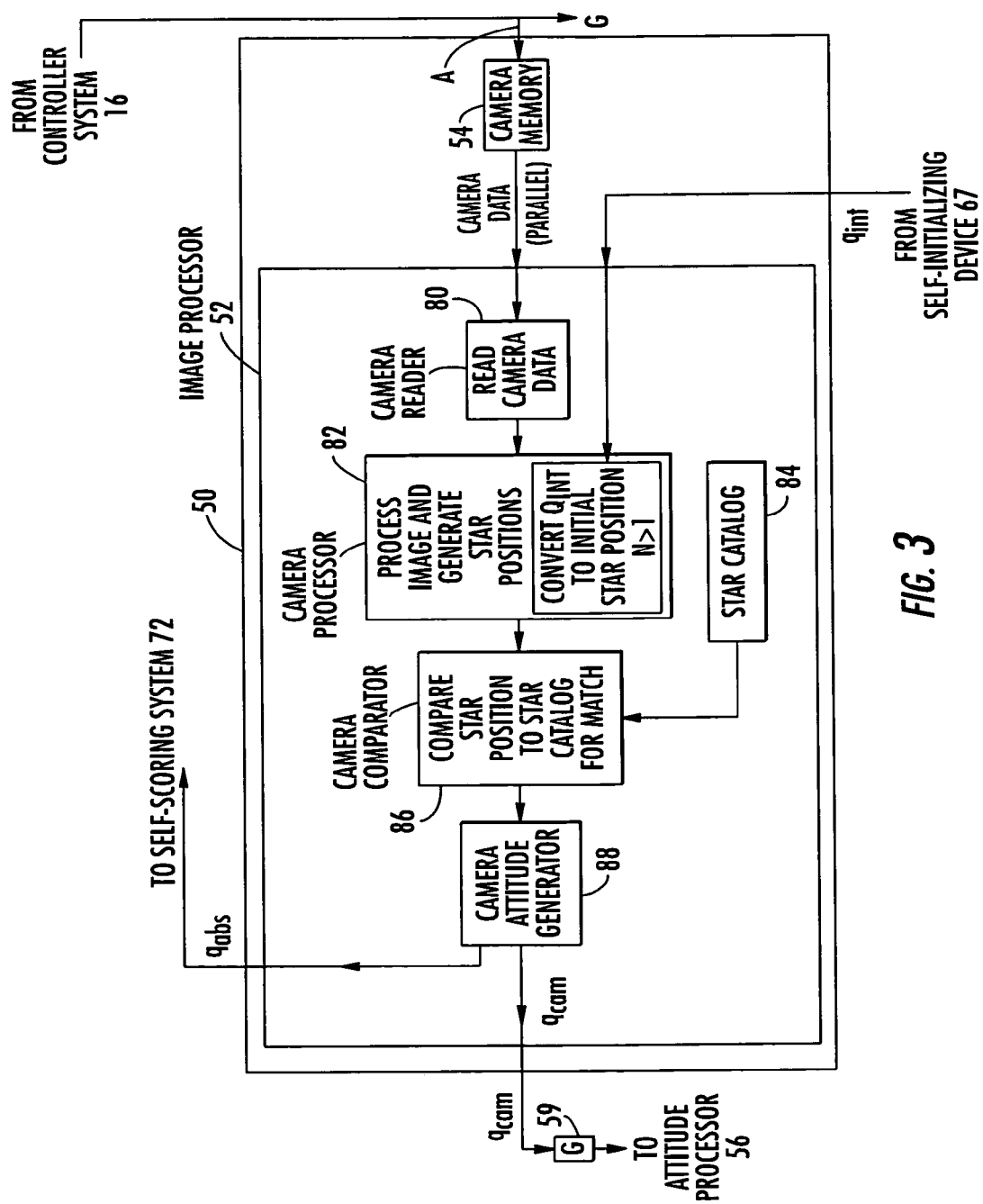
FIG. 3 is a more detailed block diagram of the image processor of FIG. 2.

In operation, flight computer 18 receives stream of data C which includes synchronously integrated star camera system output A and gyroscope system G. As noted above, in one example the star field image includes x, y location coordinates and intensity for each star location which are represented by output A, in serial digital form. Star camera system processor 50, FIG. 3 selectively converts output A (within stream of digital data C) from serial to parallel. Camera memory 54 stores the star field image as parallel digital data.

Camera reader 80 reads the stored star field image and camera processor 82 processes the read star field image to generate star positions. As is known in the art, the generated star positions are a list of centroids representing potential star positions in the star camera field-of-view. Star catalog 84 contains known star positions. Camera comparator 86 compares the star positions generated by camera processor 82 with the known star positions from star catalog 84 and if there is a match, camera attitude generator 88, responsive to an output from camera comparator 86, measures the angular separation between star positions and generates the star camera attitude $q_{cam}$, for output to attitude processor 56. Also, when the self-scoring system 72 is enabled as discussed below, camera attitude generator 88 generates an absolute attitude, $q_{abs}$, which is output to the self-scoring system at times when $q_{cam}$ is not being output to attitude processor 56. The absolute attitude $q_{abs}$ represents the attitude of the aerospace vehicle as determined by star field images acquired by the star camera at a high frequency as further discussed below.

Generating star camera attitude $q_{cam}$ (and $q_{abs}$) thus involves establishing star positions from observed data and comparing the star positions to the star catalog. However, this process is computationally more intensive if no prior knowledge of the aerospace vehicle attitude is available (the so-called "lost-in-space" problem). In such a case the generated star positions must be compared to the entire star catalog. This is a problem conventional systems have each time a star field image is obtained. To help avoid this problem the subject invention may use the previously determined $q_{int}$, after initial power up, because the attitude of the aerospace vehicle $q_{int}$ has been determined (at least once). Thus, to alleviate the "lost-in-space" problem after power up, i.e., to self initialize, camera processor 82 receives the attitude of the aerospace vehicle $q_{int}$ from star camera self-initializing device 67. In such situations, i.e. when N>1, camera processor 82 converts $q_{int}$ to an initial star position, thus simplifying the star identification process by narrowing the area in star catalog 84 where camera comparator 86 must search to find a match.

Figure 4:
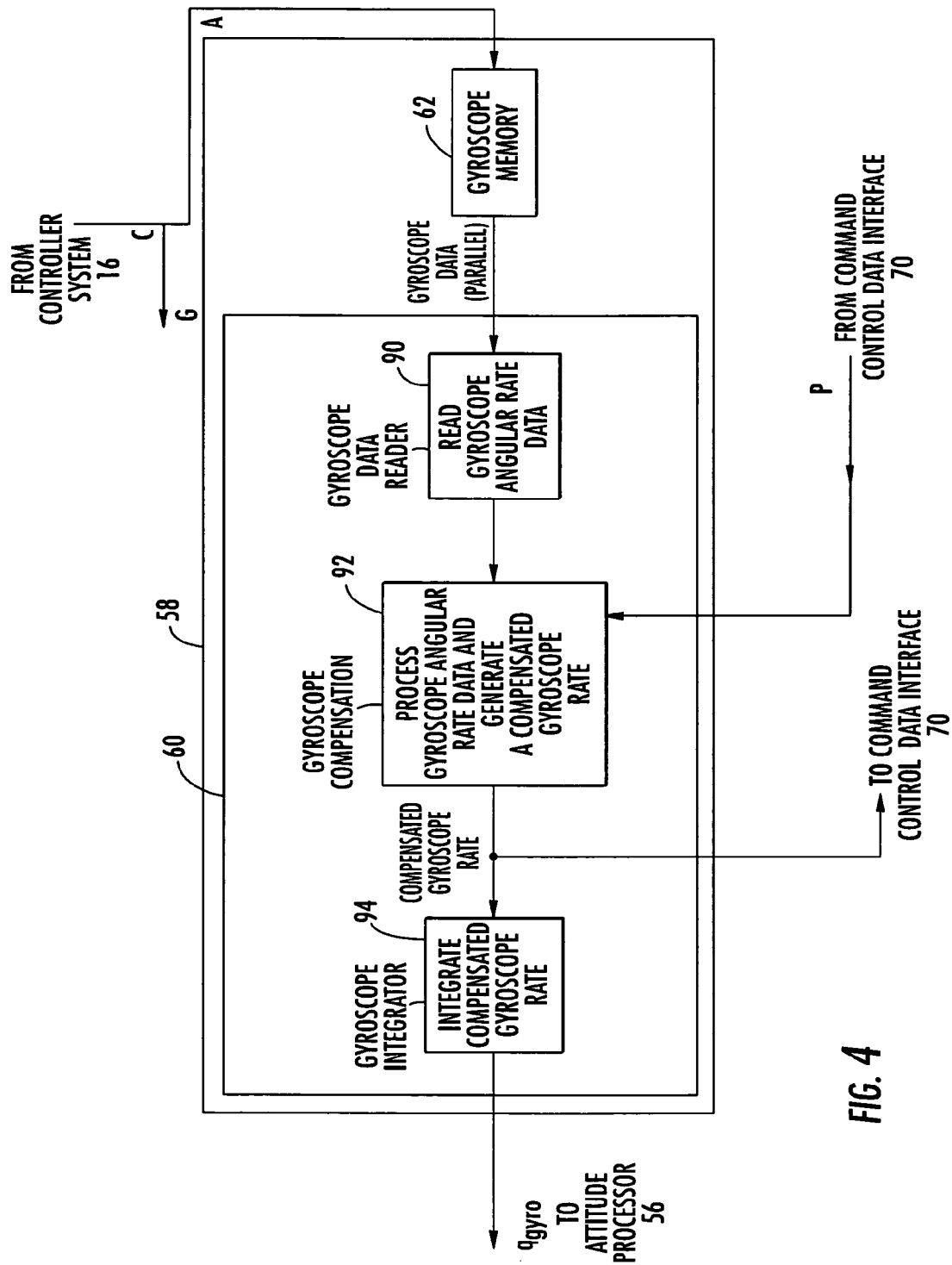
FIG. 4 is a more detailed block diagram of the gyroscope rate processor of FIG. 2.

When the flight computer receives stream of data C including the synchronously integrated star camera system output A and gyroscope system output G, gyroscope system processor 58, shown in FIG. 4 receives gyroscope system output G. As noted above, in one example gyroscope angular rate data for the MEMs gyroscope includes gyroscope system reference, rate and temperature for all three axes represented by gyroscope system output G, in serial form. Gyroscope system processor 58 selectively converts output G (within stream of data C) from serial to parallel. Gyroscope memory 62 may store the gyroscope angular rate data, which as noted above may be digital, as parallel digital data. Gyroscope data reader 90 reads the stored gyroscope angular rate data and gyroscope compensator 92 processes gyroscope angular rate data and generates a compensated gyroscope rate as necessary. Processing angular rate and generating a compensated gyroscope rate is known in the art for traditional gyroscopes, but for the MEMs gyroscope, processing may also include removing errors related to temperature and reference as described in U.S. Pat. No. 5,349, 855, U.S. patent application Ser. No. 10/264,887 and PCT Patent Application WO 03/031912A2, each of which is hereby incorporated herein in its entirety by reference. Gyroscope compensator 92 processes the gyroscope angular rate according to a command P received from the command control data interface, which ultimately comes from the user of the system or according to a separate program for gyroscope compensation, as is known in the art. Gyroscope integrator 94 integrates the compensated gyroscope angular rate and generates gyroscope attitude $q_{gyro}$ for output to the attitude processor 56. The gyroscope attitude $q_{gyro}$ may also be output to the command control data interface and on to the user for evaluation and adjustments as necessary, at which time a further command from the user or gyroscope compensation program to the command control data interface may be forwarded to gyroscope compensator 92.

An overview of the interplay between the star camera system and the gyroscope system may be summarized as follows. As noted, upon power up of the integrated inertial stellar attitude sensor 8, i.e. when N=1, the gyroscope attitude gating device is open, preventing $q_{gyro}$ from proceeding to the attitude processor. Thus, for N=1, $q_{int}$ is equal to $q_{cam}$ (because there is no $q_{gyro}$ input). However, $q_{cam}$ is difficult to determine when N=1 since the so-called "lost-in-space" problem is encountered because there is no previous $q_{int}$. To reduce for the lost-in-space problem at N=1, the attitude processor may utilize the Lost-in-Space attitude determination algorithm developed by Mortari. The Mortari algorithm identifies stars in the star field image against a star catalog of 1500 stars to help identify the star camera's line of sight without any prior knowledge of the attitude of the aerospace vehicle. A description of the Mortari algorithm may be found in Mortari, D. Junkins, J. and Samaan, M. "Lost in Space Pyramid Algorithm for Robust Star Pattern Recognition", 24th Annual AAS Guidance and Control Conference, Breckenridge, Colo., 31 Jan.-4, Feb. 2001, which is hereby incorporated herein by reference in its entirety. Thereafter, the advantages of the present invention over conventional systems becomes even more clear. For N>1, the gyroscope system of the subject invention is used to maintain aerospace vehicle attitude knowledge continuously until the next star camera system update can be obtained. Under typical operating conditions, i.e. when N>1, the gyroscope attitude $q_{gyro}$ drives the attitude of the aerospace vehicle $q_{int}$. The gyroscope system samples inertial or angular rates at a high frequency, which may be about 320 Hz.

Figure 5:
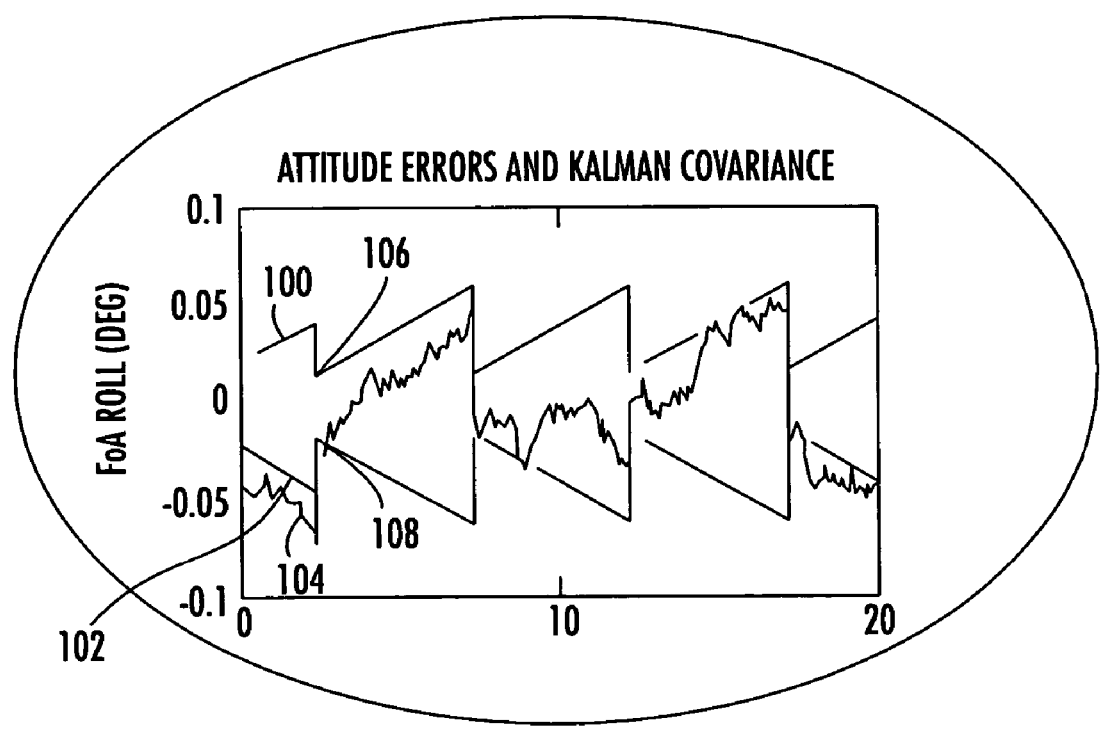
FIG. 5 illustrates an example single-axis attitude error profile and corrections by the integrated inertial stellar attitude sensor of the subject invention.

Thereafter, the attitude of the aerospace vehicle $q_{int}$ is determined and communicated to the host spacecraft or aerospace vehicle in real time at approximately 5 Hz. At a programmable fixed interval, as indicated by a user determinable threshold error as discussed below—which in one example is approximately every five minutes—the star camera system obtains a new star field image and determines $q_{cam}$, which is used to correct attitude errors including but not limited to, gyroscope drift, scale factor, bias errors and Angle Random Walk. In FIG. 5, lines 100, 102 represent an example of 1-sigma (0.1°) error bounds, and line 104 represents the attitude of the aerospace vehicle $q_{int}$. When the star camera system obtains a new star field image and determines a new $q_{cam}$, $q_{int}$ is updated, as shown by the sudden narrowing of the error bounds 106 and 108. Thus, error within 1-sigma may be maintained.

The fusion of gyroscope system and star camera system data in this invention provides a significant improvement in the performance of both devices, resulting in a more robust aerospace vehicle attitude determination system than could be achieved by integrating separate star tracker and gyroscope units in the traditional manner. The gyroscope system may provide information at high frequency, for example approximately 3.3 Hz, during periods when the spacecraft may be undergoing high slew rates (up to 50°/second) such that the camera cannot obtain good star field images (due to unacceptable pixel smearing or blurring and during periods when the camera is occluded by the Sun, Moon or Earth).

The star camera system provides information for periodic $q_{cam}$ updates to bring the aerospace vehicle attitude back within error bounds. Thus, in one example of the present invention a desired accuracy may be maintained as long as there is a star camera attitude ($q_{cam}$) update after five minutes, or after one full revolution (360°) in each axis, whichever comes first. Also, when the spacecraft attitude rate exceeds the camera's optical tracking limit, aerospace vehicle attitude accuracy can be maintained provided that the vehicle motion later returns to an acceptable range for camera imaging, e.g., 0.25°/second.

The calculation of the aerospace vehicle attitude $q_{int}$ occurs in attitude processor 56, FIG. 6. By way of overview, attitude processor 56 receives and processes star camera attitude $q_{cam}$ and gyroscope attitude $q_{gyro}$. Aerospace vehicle attitude propagator 64 propagates the attitude of the aerospace vehicle $q_{int}$, and error estimator 66 estimates aerospace vehicle attitude error $q_{int\ error}$. Star camera self-initializing device 67 provides the attitude of the aerospace vehicle $q_{int}$ to the image processor 52, specifically, to the camera processor, and gyroscope self-initializing device 68 provides star camera attitude $q_{cam}$ (updates, as discussed above) to aerospace vehicle attitude propagator 64 to correct for gyroscope errors that may have been included in the $q_{gyro}$ aspect of previous determinations of $q_{int}$. From attitude processor 56, the attitude of the aerospace vehicle $q_{int}$ and the aerospace vehicle attitude error $q_{int\ error}$ are output to command control data interface 70.

Predictive filter 110 within attitude processor 56 may be a Kalman Filter that includes both aerospace vehicle attitude propagator 64 and error estimator 66, the latter of which are implemented by the Kalman Filter. Although the subject invention is not limited to a Kalman Filter or any other type of estimator with any particular number of states, predictive filter 110 preferably employs a 27 state square root Kalman Filter. Kalman Filters are known in the art for use in attitude determination systems, as illustrated in Zarcha, Paul, Musoff, Howard, "Progress in Astronautics and Aeronautics Series" Published by AIAA, © 2000. The twenty-seven (27) states of the Kalman Filter include: three (3) states for attitude error; three (3) states for turn on bias (degrees/hour); three (3) states for turn on scale factor (parts per million); three (3) states for bias stability over time (degrees/hour); three (3) states for bias stability over temperature (degrees/hour); three (3) states for scale factor stability over time (parts per million); three (3) states for scale factor stability over temperature (parts per million); six (6) states for alignment 9 (each axis has two (2) depth-of-field DOF alignment states).

The attitude of the aerospace vehicle $q_{int}$ is output to error estimator 66 for inclusion in the Kalman Filter with $q_{cam}$ for determining aerospace vehicle attitude error $q_{int\ error}$. As noted, the consequence of having gyroscope attitude gating device 59 open upon system power up is that the first attitude of the aerospace vehicle $q_{int}$ will be equal to $q_{cam}$. For N>1 and when there is an available $q_{int}$ error from previous calculations, the aerospace vehicle attitude error $q_{int\ error}$ is output to aerospace vehicle attitude propagator 64 to be taken into account in the Kalman Filter with $q_{cam}$ and $q_{gyro}$ for determining the (next) attitude of the aerospace vehicle $q_{int}$. The foregoing description of the operation of this invention is more efficient, more reliable, and less expensive than conventional systems, where the host spacecraft engineers or others are required to develop complex, expensive and less-than-ideal software for the host spacecraft computer in order integrate the separate and often incompatible gyroscope data and the star camera data into meaningful attitude information.

Figure 7:
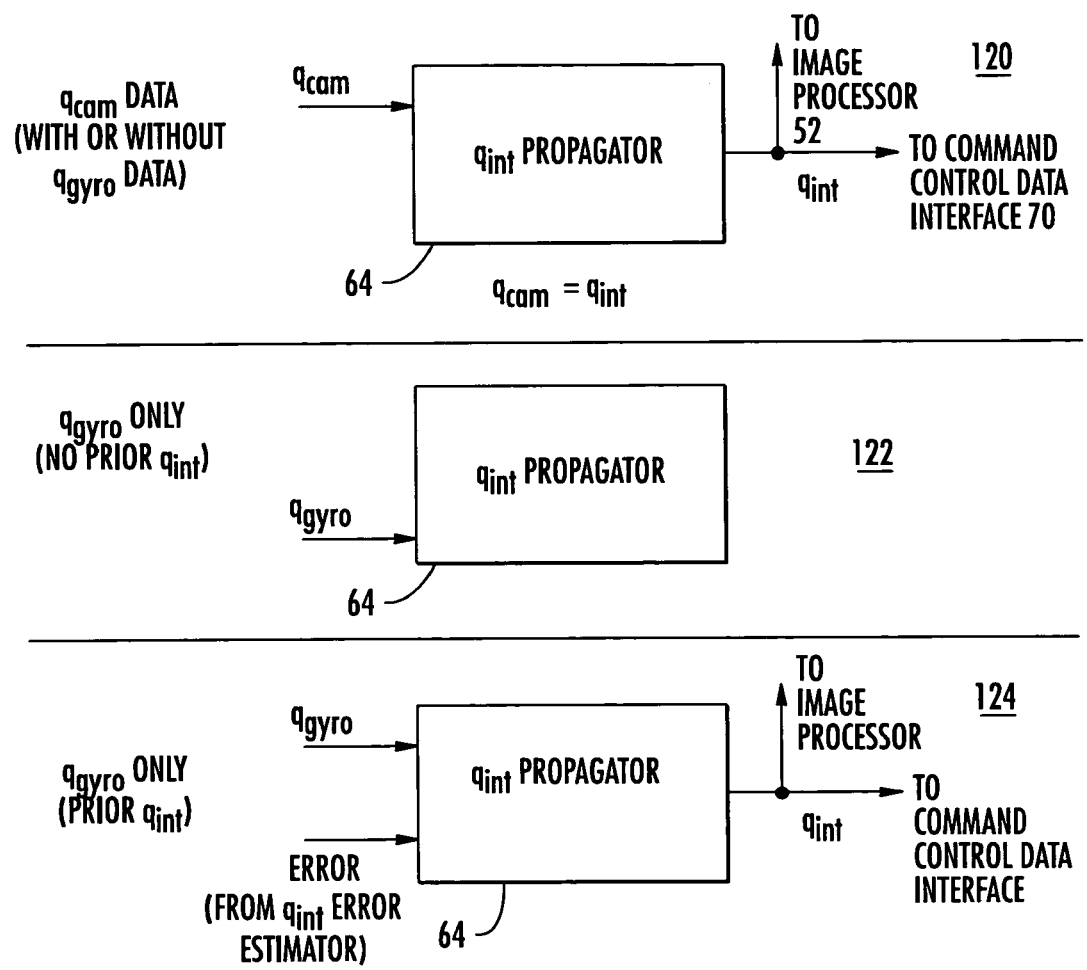
FIG. 7 is a more detailed view of the attitude propagator of FIG. 6 showing incoming and outgoing data.

FIG. 7 illustrates the conditions when the aerospace vehicle attitude $q_{int}$ is output to the command control data interface 70. In the first scenario 120, when aerospace vehicle attitude propagator 64 receives a star camera attitude $q_{cam}$, the aerospace vehicle attitude $q_{int}$ will be output and $q_{int}$ will be equal the star camera attitude $q_{cam}$. This will be true whether or not aerospace vehicle attitude propagator 64 also receives a gyroscope attitude $q_{gyro}$. As noted above, this outcome may occur at power up of the system when N=1, and when the star camera system obtains a new star field image, determines a new $q_{cam}$, and updates $q_{int}$ to correct for gyroscope errors, it promotes keeping errors within 1-sigma. In the second scenario 122, when aerospace vehicle attitude propagator 64 receives only a gyroscope attitude $q_{gyro}$, and there has been no prior calculation of $q_{int\ error}$, no aerospace vehicle attitude $q_{int}$ is generated. This situation generally may occur rarely. One example is at power up of the system, but before a star camera attitude $q_{cam}$ can be determined, for instance when the spacecraft motion is beyond an acceptable range for camera imaging.

In the third scenario 124, when aerospace vehicle attitude propagator 64 receives only a gyroscope attitude $q_{gyro}$, but a prior aerospace vehicle attitude $q_{int}$ has been determined, a new aerospace vehicle attitude $q_{int}$ will be generated based on the gyroscope attitude $q_{gyro}$ and the aerospace vehicle attitude error $q_{int\ error}$. This situation may occur between camera updates, i.e. between $q_{cam}$ updates, while the star camera system is "riding the gyro" and the aerospace vehicle attitude determination depends solely on the gyroscope system information.

Figure 8:
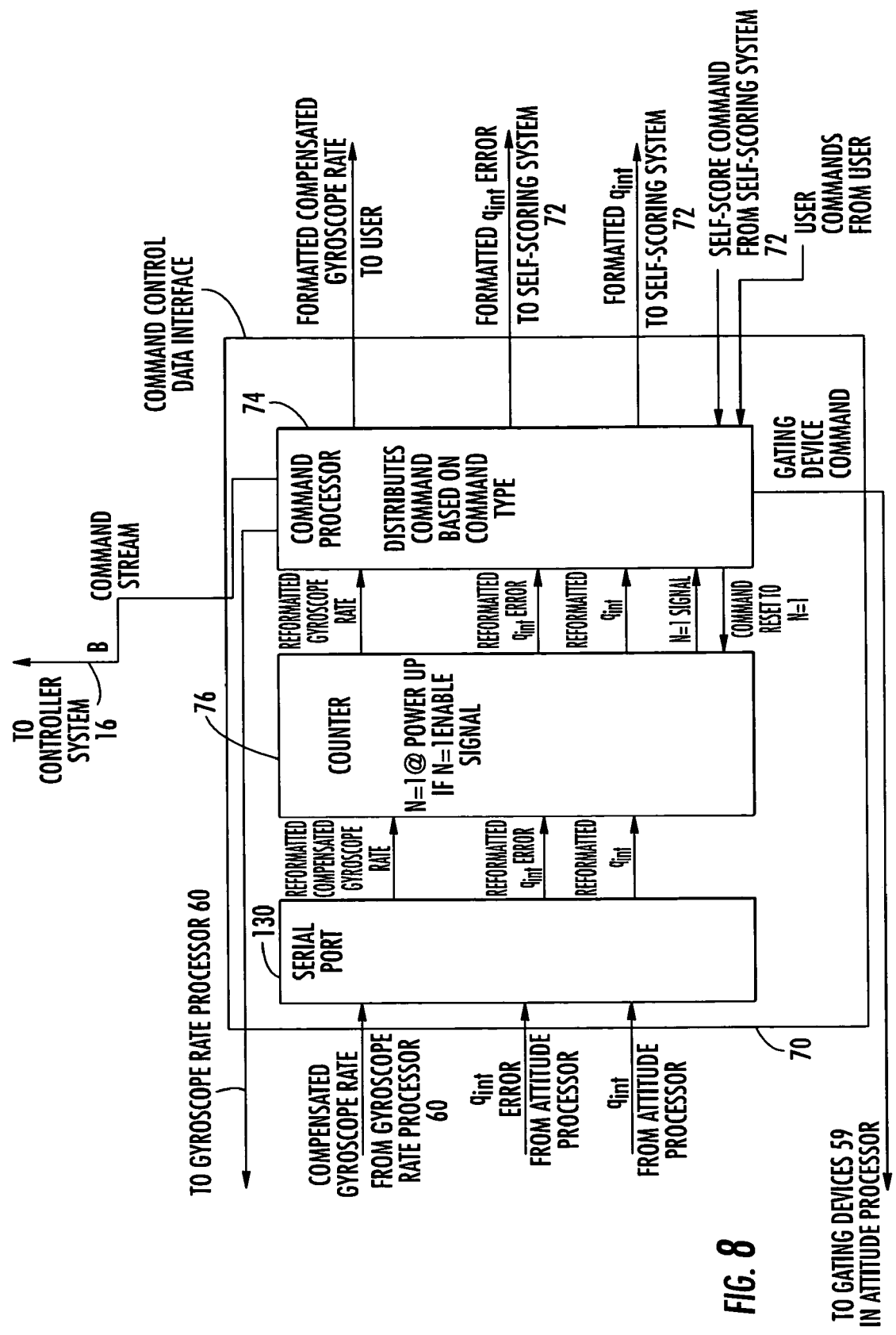
FIG. 8 is a more detailed block diagram of the command control data interface of FIG. 2.

Command control data interface 70, FIG. 8, typically serves as the central command system for receiving and forwarding various system commands depending on the type of command. Command control data interface 70 receives the aerospace vehicle attitude $q_{int}$ and the aerospace vehicle attitude error $q_{int\ error}$ from the attitude processor, as well as the compensated gyroscope rate from the gyroscope rate processor. Serial port 130 may reformat the signals representing the attitude of the aerospace vehicle $q_{int}$, the aerospace vehicle attitude error $q_{int\ error}$, and/or the compensated gyroscope rate. The reformatted signals representing the attitude of the aerospace vehicle $q_{int}$ and the aerospace vehicle attitude error $q_{int\ error}$ are output from command control data interface 70 to the self-scoring system 72. The reformatted signal representing compensated gyroscope rate is output to the user or another computer. Counter 76 counts the number of times the attitude of the aerospace vehicle $q_{int}$ has been propagated. If N=1, counter 76 sends an N=1 gating signal to command control data interface 70. When command control data interface 70 receives the N=1 gating signal, command control data interface 70 sends a gating device command to open the gyroscope attitude gating device 59, as indicated above.

Command control data interface 70 typically also includes command processor 74 for distributing the various commands and information based on command type. For example, the gyroscope attitude gating device command is distributed by the command processor to the gyroscope attitude gating device 59 to open the gating device. In another example, the user may want to reset the counter to N=1, or provide another appropriate override command. Such a command may be distributed from command processor 74 to counter 76. Preferably, command processor 74 distributes various commands to the controller system via command stream B. Commands concerning the gyroscope system or the star camera system, such as self-score continuous frequency command and self-score low frequency command as set forth below, are output to command control data interface 70 and into command stream B. In another example, the user may forward a command to command control interface to change the gyroscope compensation, or to increase the star camera rate of star field image acquisition to a greater frequency even if self-scoring does not call for the increase. A detailed description of some of the various commands received and distributed by command control interface 70 is set forth in connection with the discussion below of the controller system.

Figure 9:
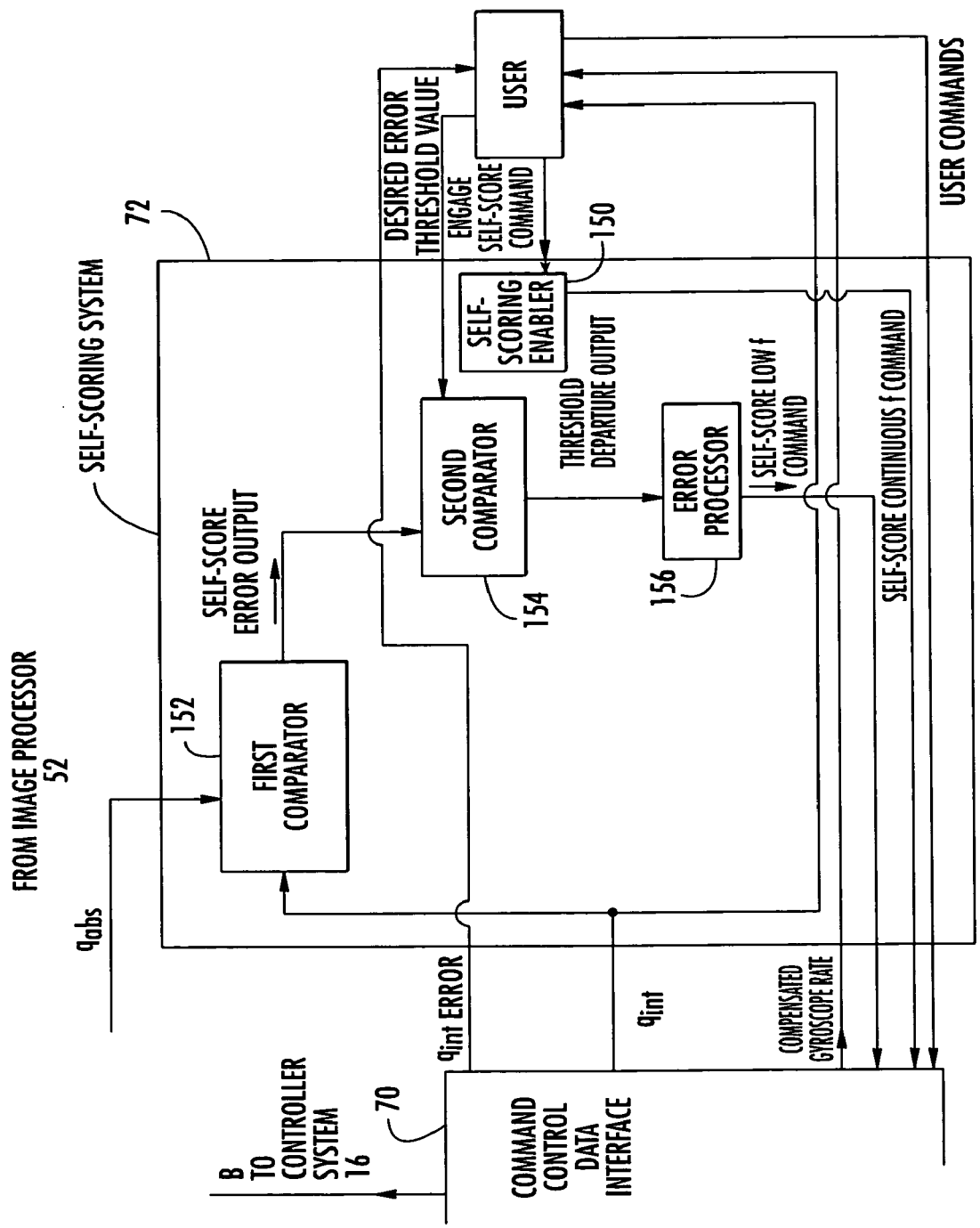
FIG. 9 is a more detailed schematic block diagram of the self-scoring system of FIG. 2.

Self-scoring system 72, FIG. 9, identifies error trends in the aerospace vehicle attitude $q_{int}$ over time. This should not be confused with the occasions when the star camera system obtains a new star field image and determines a new $q_{cam}$ and $q_{int}$ is updated to keep $q_{int}$ within the aforementioned error bounds. However, the $q_{cam}$ updates to keep $q_{int}$ within those error bounds, and the self-scoring identification of $q_{int}$ error trends, are intimately related. The outcome of self-scoring determines how often $q_{cam}$ updates should be performed.

In operation, self-scoring system 72 preferably includes enabler 150 for enabling self-scoring system 72 and generating a self-score continuous frequency command to output to command control data interface 70. When command control data interface 70 receives the self-score continuous frequency command, command control data interface 70 forwards the continuous frequency command to the controller system to increase the star camera rate of star field image acquisition to continuous frequency. Continuous frequency is the fastest star field image acquisition rate possible for the particular camera used with the system. Continuous frequency star camera attitude $q_{abs}$ represents the absolute attitude of the aerospace vehicle as determined for a limited time period of continuous star camera star field image acquisition. In one example, the absolute attitude $q_{abs}$ is determined by the image processor in the same manner as star camera attitude $q_{cam}$ as described above and forwarded to first comparator 152. The distinction between $q_{abs}$ and $q_{cam}$ is that the former is determined by continuous star camera field image acquisition over the limited time period when self-scoring system 72 is enabled; the latter is determined every five minutes, for example, to update $q_{int}$. First comparator 152 compares a continuous frequency star camera attitude $q_{abs}$ over time with the attitude of the aerospace vehicle $q_{int}$ over time and provides a self-score error output. Second comparator 154 compares the self-score error output to a desired error threshold value and may provide a threshold departure output. The desired error threshold value is set by the user. For greater accuracy, the user will set the desired error threshold value to a smaller value. If the self-score error output is greater than the desired error threshold value, error processor 156 outputs a self-score low frequency command to command control data interface 70 to increase the star camera rate of star field image acquisition to a greater frequency, i.e. to less than every five minutes.

Figure 10:
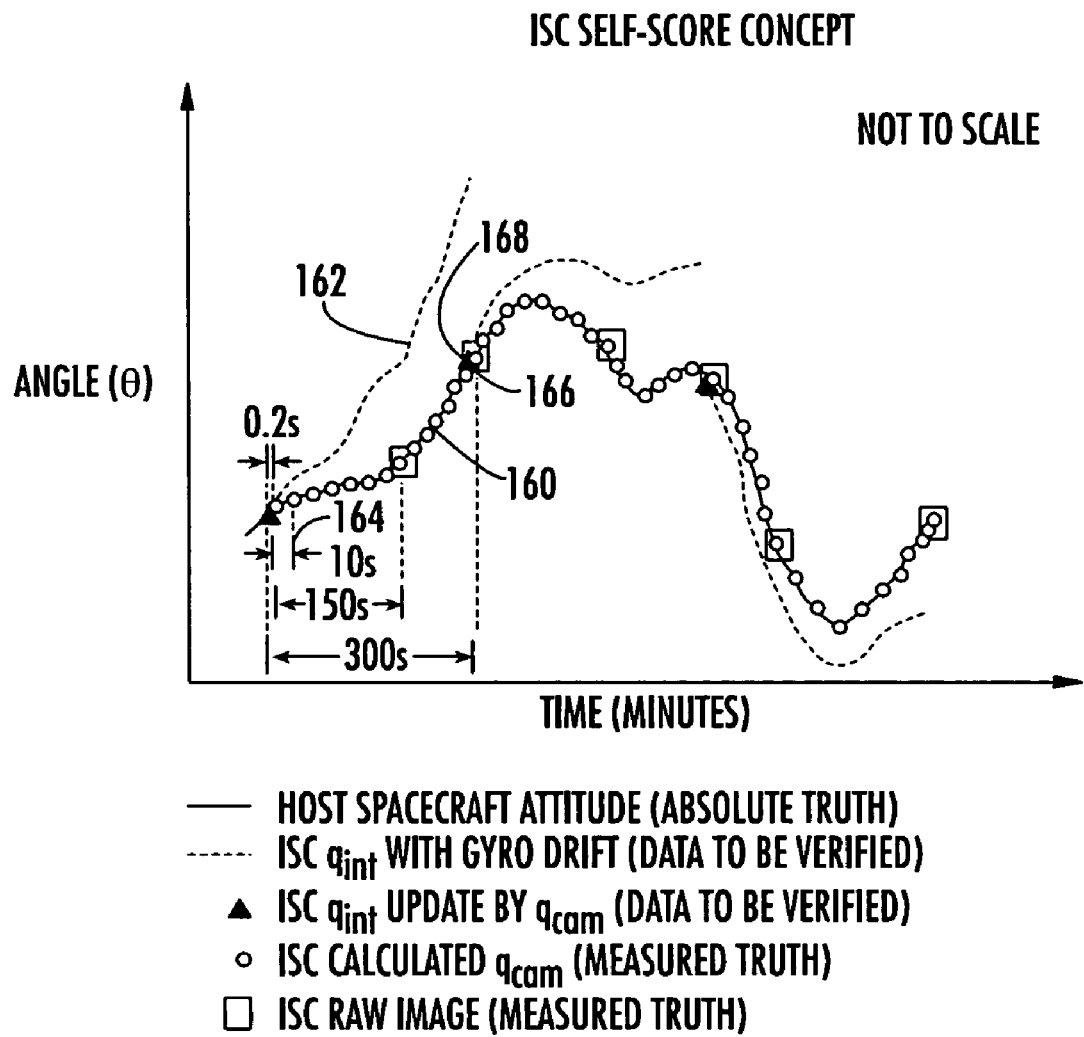
FIG. 10 is a graph of example angle v. time illustrating the function of the self-scoring system of FIG. 9.

To better show the interrelationship between $q_{cam}$ updates and self-scoring, FIG. 10 illustrates an example of self-scoring by plotting angle θ in one dimension versus time. When self-scoring is enabled, continuous frequency star camera attitude $q_{abs}$ over time, as represented by solid line 160, is measured. The attitude of the aerospace vehicle $q_{int}$ over time as determined by the sensor of the subject invention is represented by dotted line 162. The closer line 162 is to line 160, the greater is the accuracy of the system. For example, at time 164 where t=10 seconds, the difference between $q_{abs}$ and $q_{int}$ is small. In contrast, at time 166 where t=300 seconds, the difference between $q_{abs}$ and $q_{int}$ is larger. Therefore, if $q_{int}$ is updated by $q_{cam}$ every five minutes at time t=300 seconds, $q_{int}$ may not be as accurate as it would be if $q_{int}$ were updated by $q_{cam}$ every 10 seconds. Thus, if the error threshold value is less than the difference between $q_{abs}$ and $q_{int}$ at time=300 seconds, self-scoring system 72 will command star field camera acquisition more frequently than every five minutes, and consequently more frequent $q_{cam}$ updates will be made to $q_{int}$. Therefore, over and above the $q_{cam}$ updates to $q_{int}$ for accuracy, self-scoring system 72 provides another level of accuracy by ensuring that $q_{cam}$ updates are being performed often enough to keep the accuracy of $q_{int}$ within a desired error threshold value. One skilled in the art will recognize that various $q_{cam}$ update frequencies may be appropriate in different conditions and/or to achieve a particular accuracy goal.

Figure 11:
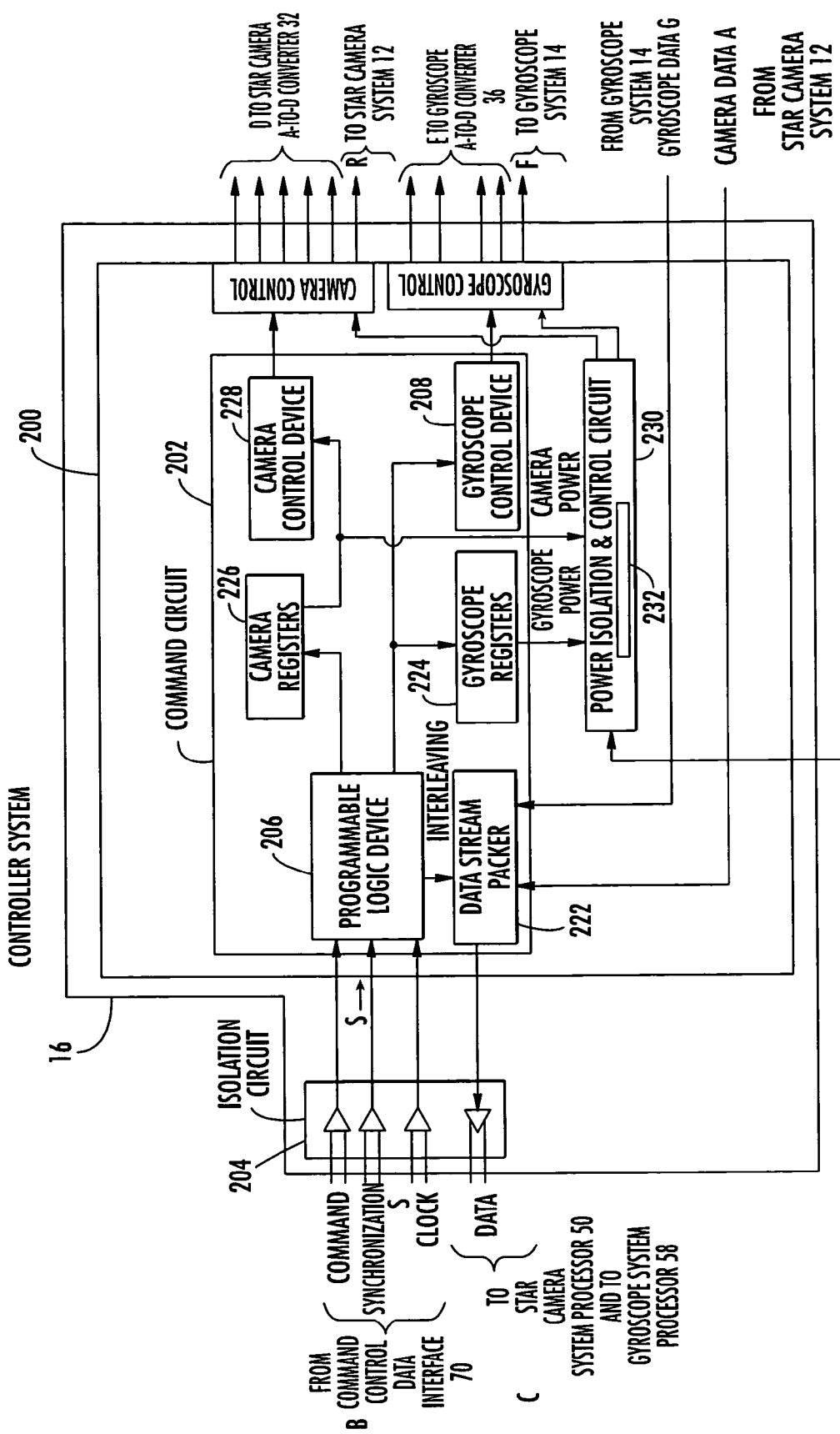
FIG. 11 is a more detailed schematic block diagram of the controller system of FIG. 2.

Controller system 16, FIG. 11, serves to control various aspects of integrated inertial stellar attitude sensor 8, including execution of many of the commands previously described. Command stream B, that includes various command types and information from the command control data interface, is output to controller system 16. Controller system 16 may include field programmable gate array 200, command circuit 202 and isolation circuit 204. Isolation circuit 204 isolates command stream B from stream of data C. Command stream B is then input into command circuit 202, while stream of data C is output from command control circuit 202.

As discussed above, stream of data C includes the outputs A and G of the star camera system and gyroscope system, respectively. Command circuit 202 selectively and synchronously integrates the outputs A and G in a predetermined pattern within stream of data C in order to isolate these outputs from each other during their integrating. Programmable logic device 206 implements the selective synchronous integration of the outputs A and G in the predetermined pattern. The predetermined pattern is set by information from command control data interface 70, and that information is contained within command stream B. The interaction between that information within command stream B and its effect on stream of data C is more particularly described as follows.

Command stream B typically includes command, synchronization and clock data. Synchronization data S contained within command stream B may proceed through isolation circuit 204 and on to programmable logic device 206. Synchronization data S within command stream B dictates to programmable logic device 206 the selective synchronous integration of the star camera system output and gyroscope system output in a predetermined pattern within stream of data C. Based on synchronization data S, programmable logic device 206 directs gyroscope control device 208 to output as part of signal E a command to the gyroscope system, or the gyroscope analog-to-digital converter if the latter is included with the system. This command controls when the gyroscope system or gyroscope analog-to-digital converter may accept the gyroscope output G, in order that camera data bits and gyro data bits may be interleaved within the serial digital data stream C.

Figure 12:
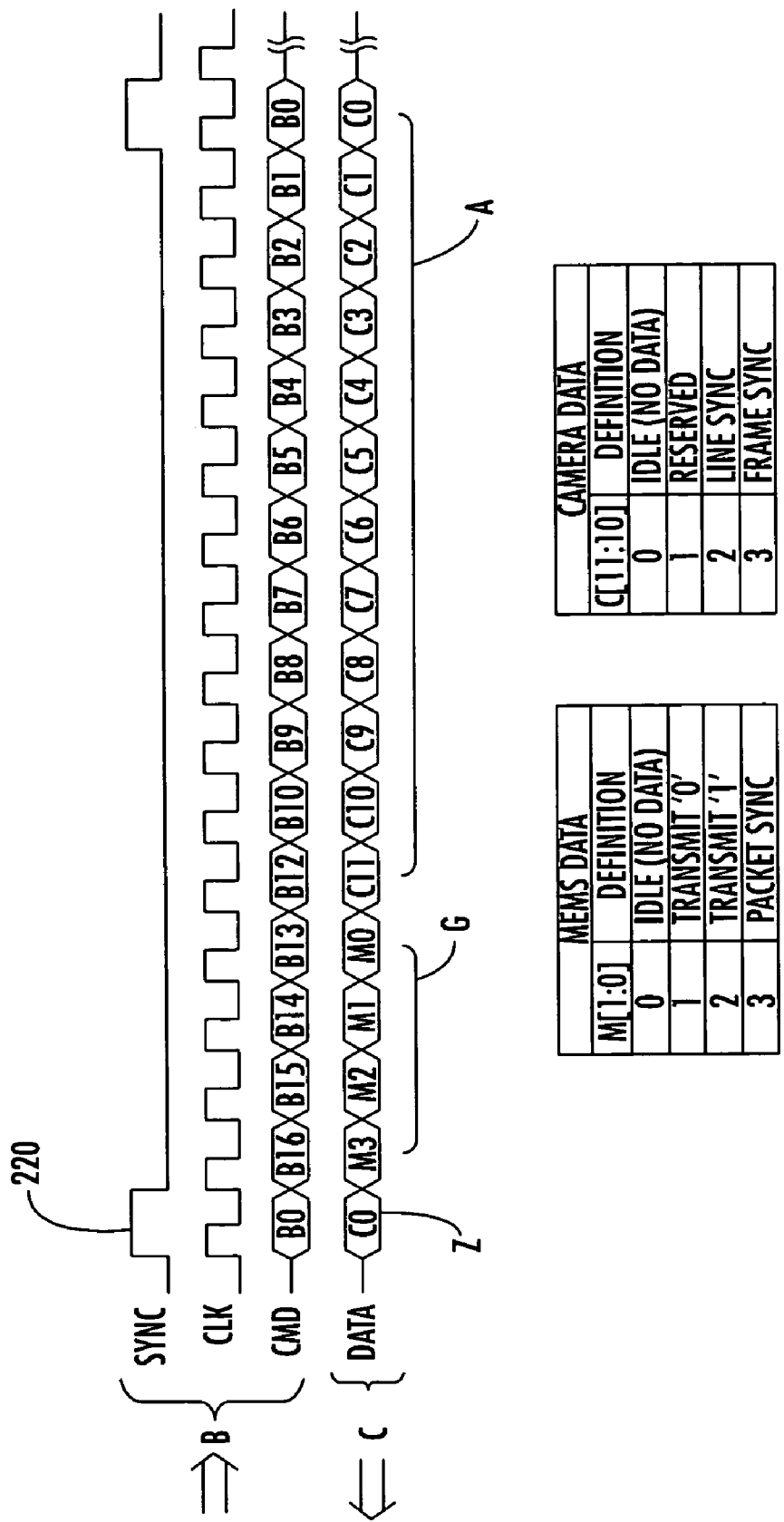
FIG. 12 is a schematic illustration of an example of bit data flow occurring in the stream of digital data input to and output from the controller system of FIG. 11.

As shown in FIG. 12, the predetermined pattern may include star camera system output A containing bits C0–C11 interleaved with gyroscope system output G, containing bits M0–M3. Bits C0–C11 may represent no camera data, or the beginning of camera data, or a digital representation of pixel intensity. Bits M0–M3 may represent no gyroscope data, the beginning of gyroscope data, or gyroscope data itself. In this example, the command that controls when the gyroscope analog-to-digital converter may accept the gyroscope output G will allow acceptance of gyroscope data only at G, and not at A or Z.

Thus, in accordance with the synchronization data S in command stream B, FIG. 11, programmable logic device 206 sets the predetermined pattern, and based on the predetermined pattern, data stream packer 222 interleaves the output of the star camera system A and the output of the gyroscope system G into the stream of data C. The interleaving of the star camera and the gyroscope data of this invention allows the information to be processed without involving the host spacecraft computer to allow for a less power intensive, more reliable host data acquisition system.

Command circuit 202 includes gyroscope registers 224, including at least one gyroscope register. Programmable logic device 206 also may set gyroscope registers 224, and gyroscope control device 208, responsive to the settings of gyroscope registers 224, controls the gyroscope. Examples of gyroscope register settings include gyroscope power and gyroscope reference settings. Also, in the case of a MEMs gyroscope, gyroscope register settings may include rate and/or temperature.

Controller system 16 and command circuit 202 also includes camera registers 226, including at least one camera register, to set, for example, star camera rate of image acquisition, field-of-view, sensitivity (the ability to distinguish stars from background), and star camera power. Command circuit 202 further includes camera control device 228, responsive to the settings of camera registers 226, for controlling the star camera.

Figure 13:
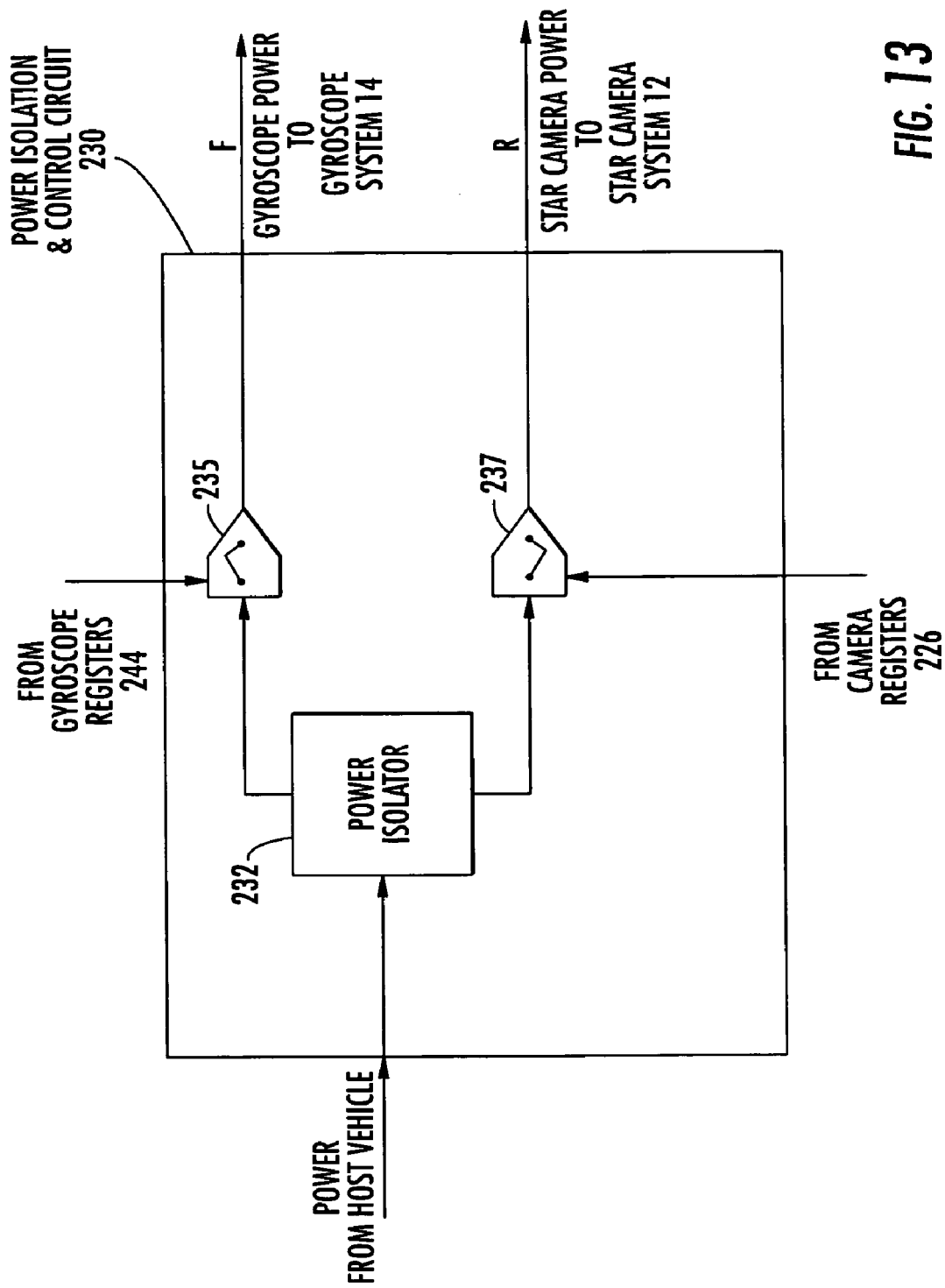
FIG. 13 is a more detailed schematic block diagram of the power isolation and control circuit of FIG. 11.

In one example, command circuit 202 includes power isolation and control circuit 230, FIG. 13. The host spacecraft provides power for the star camera system and the gyroscope system. Power isolator 232 isolates star camera power from gyroscope power to reduce noise and cross-talk between the star camera system and the gyroscope system. Then, in accordance with the gyroscope power setting of gyroscope registers 224 and the star camera power setting of camera registers 226, power is forwarded to the gyroscope system and the star camera system through switches 235 and 237. The power that is output to star camera system 12 is symbolized by R, and the power that is output to gyroscope system 14 is symbolized by F.

The subject invention thus results in a small volume, low power, integrated inertial stellar attitude sensor for an aerospace vehicle with synchronous integration of gyroscope and star camera system outputs. Periodic updates from the star camera system promote the aerospace vehicle attitude determination accuracy, and the self-scoring system reduces vehicle attitude error trends by controlling frequency of the star camera system updates. Thus, accuracy of better than 0.1° (1 sigma) in three axes, high-rate maneuver capability up to 50°/second, and self-initializing capability over 99% of the sky may be achieved. The performance and small size of the integrated inertial stellar attitude sensor 8 makes it useful for a wide range of missions, particularly, as a fully integrated, micro-satellite attitude determination system. Other applications include attitude determination on medium performance spacecraft and as a "bolt-on" independent safe-hold sensor, or coarse acquisition sensor for many other spacecraft.

Figure 14:
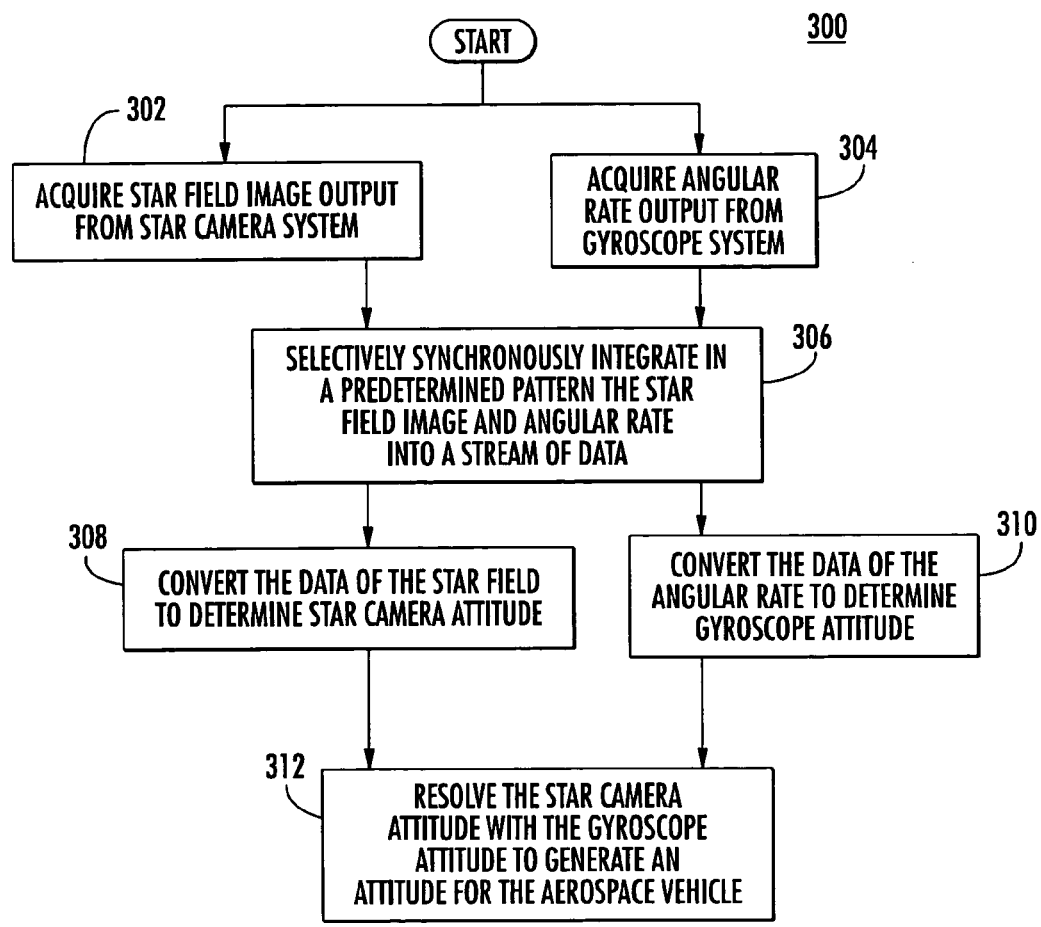
FIG. 14 is a schematic flow chart showing a method of inertial stellar attitude sensing according to the system of this invention.

Methods of inertial stellar attitude sensing that may include the apparatus are described herein. One method of inertial stellar attitude sensing 300, FIG. 14, includes acquiring an image of a star field output from a star camera system, step 302, acquiring an angular rate output from a gyroscope system, step 304, and selectively, synchronously integrating in a predetermined pattern the image of a star field and the angular rate output into a stream of data, step 306. Method 300 further includes converting the data representative of the star field into a star image, which may be represented by a star image data set, to determine the star camera attitude of the vehicle, step 308, converting the data representative of the angular rate output to determine the gyroscope attitude of the vehicle, step 310, and resolving the star camera attitude with the gyroscope attitude to generate an attitude of the aerospace vehicle, step 312.

Figure 15:
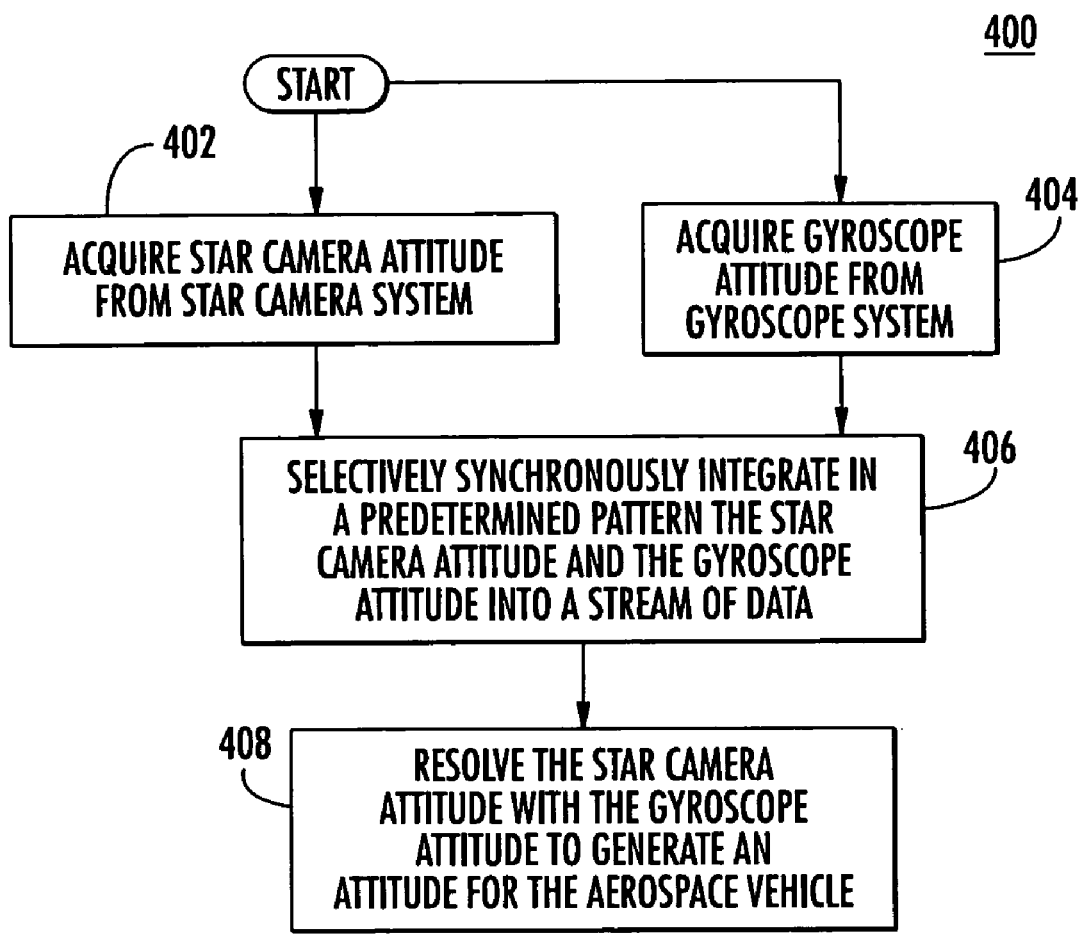
FIG. 15 is a schematic flow chart showing another method of inertial stellar attitude sensing according to the system of this invention.

This invention further features another method of inertial stellar attitude sensing for an aerospace vehicle 400, FIG. 15, that includes the steps of: acquiring a star camera attitude from a star camera system, step 402, acquiring a gyroscope attitude from a gyroscope system, step 404, selectively, synchronously integrating in a predetermined pattern the star camera attitude and the gyroscope attitude into a stream of data, step 406, and resolving the star camera attitude with the gyroscope attitude to generate an attitude for the aerospace vehicle, step 408.

Figure 16:
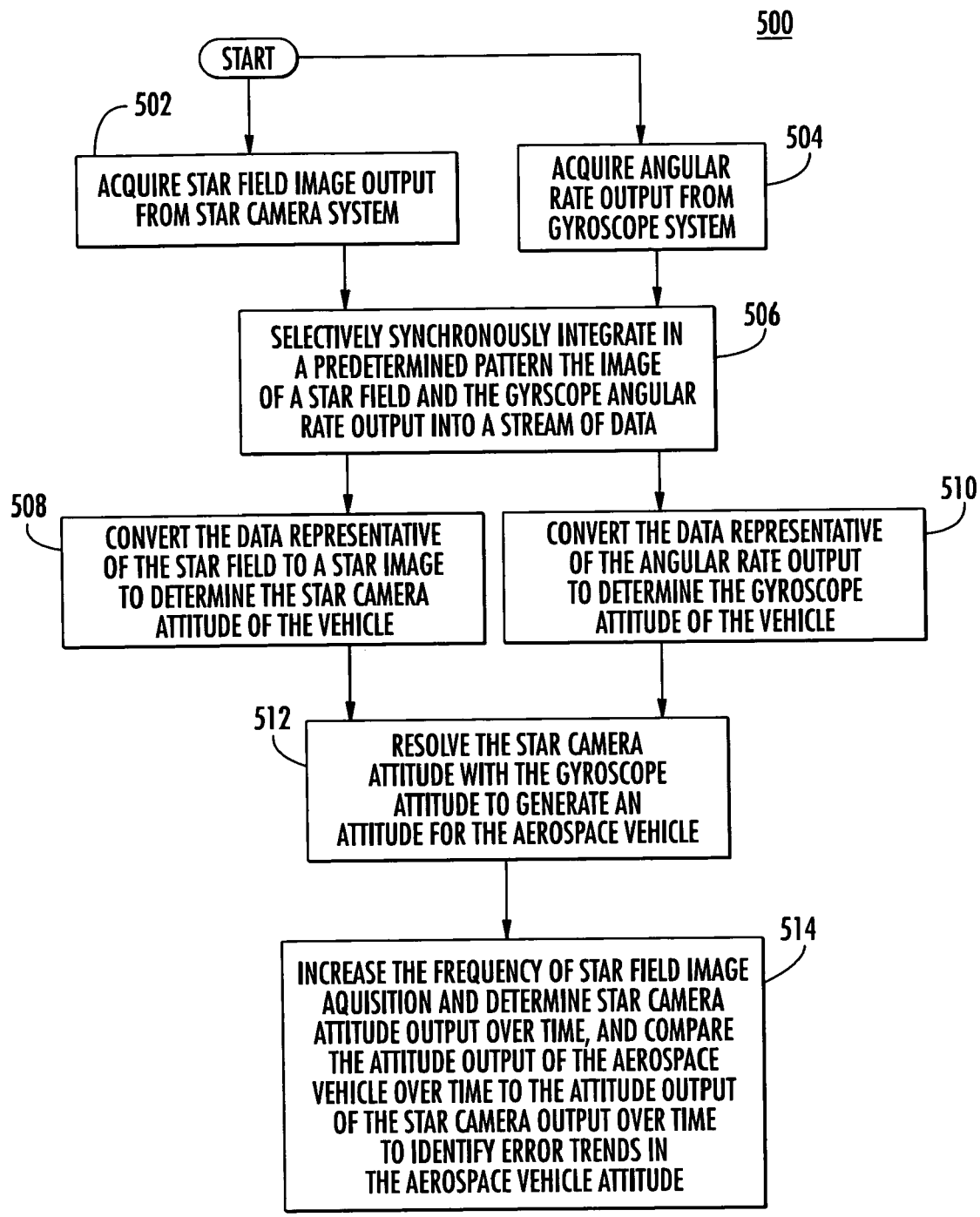
FIG. 16 is a schematic flow chart showing another method of inertial stellar attitude sensing according to the system of this, invention including identification of error trends in the aerospace vehicle attitude.

This invention also features a method of inertial stellar attitude sensing for an aerospace vehicle 500, FIG. 16, that includes acquiring an image of a star field output from a star camera system, step 502, and acquiring an angular rate output from a gyroscope system, step 504, and selectively, synchronously integrating in a predetermined pattern the image of a star field and the angular rate output into a stream of data, step 506. Method 500 further includes converting the digital data representative of the star field into a star image, which may be represented by a star image data set, to determine the star camera attitude of the vehicle, step 508, converting the data representative of the angular rate output to determine the gyroscope attitude of the vehicle, step 510, and resolving the star camera attitude with the gyroscope attitude to generate an attitude of the aerospace vehicle, step 512. Method 500 further includes increasing the frequency of star field image acquisition to continuous frequency and determining continuous frequency star camera attitude outputs over time, and comparing the attitude output of the aerospace vehicle over time to the continuous frequency attitude output of the star camera system over time to identify error trends in the aerospace vehicle attitude, step 514.

Figure 17:
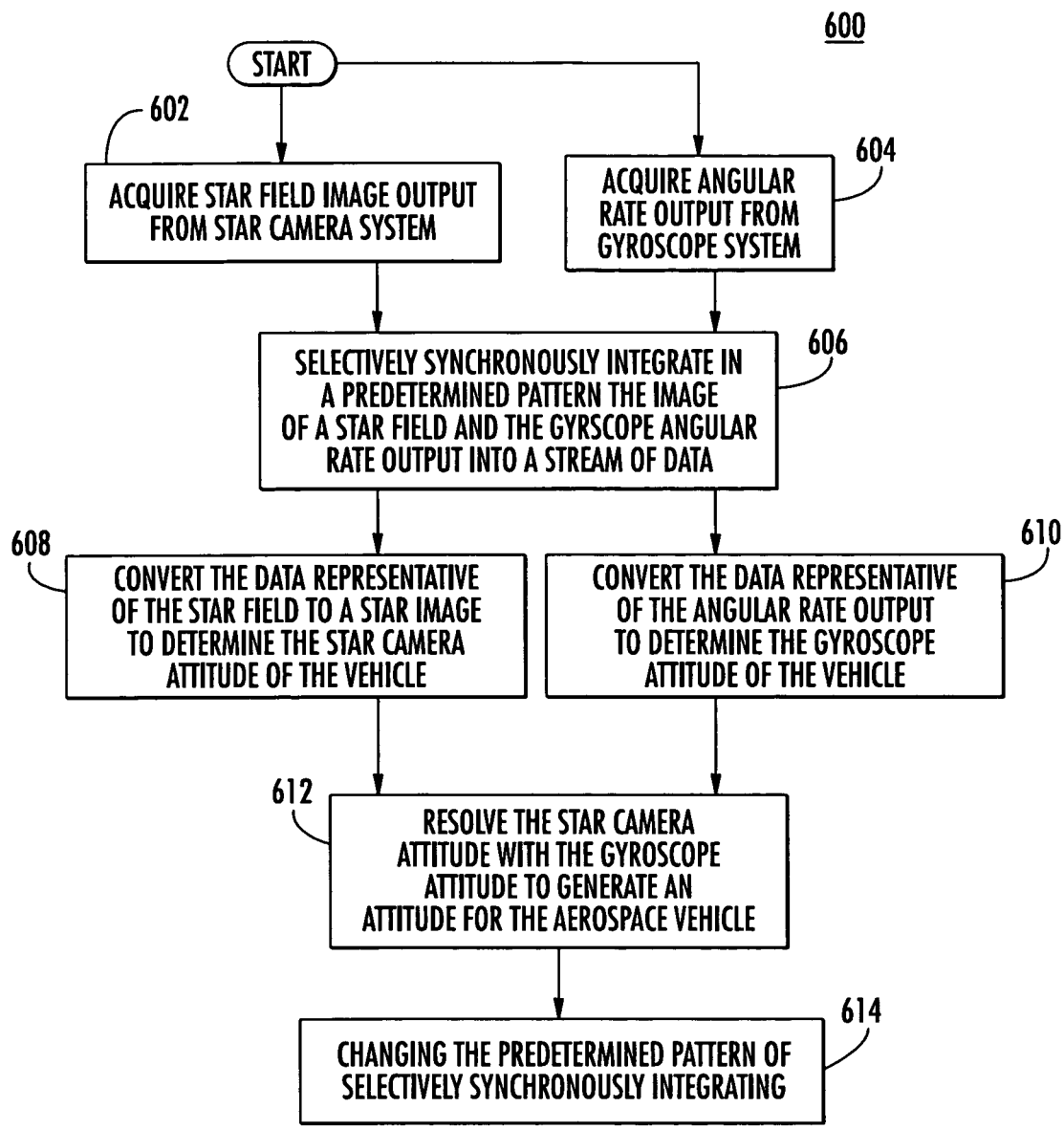
FIG. 17 is a schematic flow chart showing another method of inertial stellar attitude sensing according to this invention including periodically changing the predetermined pattern of selective synchronous integration of gyroscope and star camera system outputs.

This invention further features a method of inertial stellar attitude sensing for an aerospace vehicle 600, FIG. 17 that includes the following steps: acquiring an image of a star field output from a star camera system, step 602, and acquiring an angular rate output from a gyroscope system, step 604, and selectively, synchronously integrating in a predetermined pattern the image of a star field and the angular rate output into a stream of data, step 606. Method 600 further includes converting the digital data representative of the star field into a star image, which may be represented by a star image data set, to determine the star camera attitude of the vehicle, step 608, converting the digital data representative of the angular rate output to determine the gyroscope attitude of the vehicle, step 610, and resolving the star camera attitude with the gyroscope attitude to generate an attitude of the aerospace vehicle, step 612. Method 600 further includes periodically changing the predetermined pattern of selectively synchronously integrating, step 614.

Figure 18:
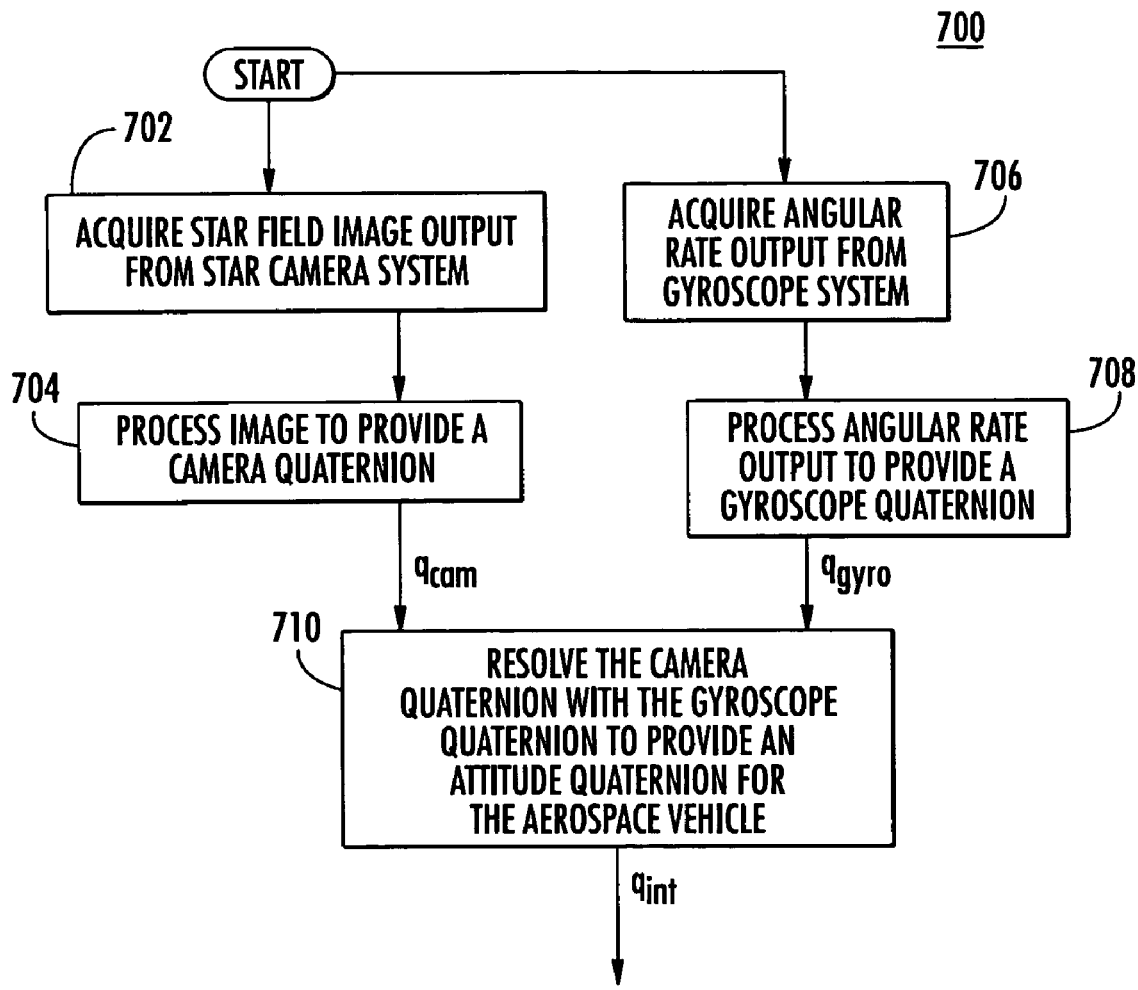
FIG. 18 is a schematic flow chart showing another method of inertial stellar attitude sensing according to this invention wherein the output attitudes are in quaternion coordinates.

This invention also features a method of inertial stellar attitude sensing for an aerospace vehicle 700, FIG. 18, that includes the steps of: acquiring an image of a star field output from a star camera system, step 702, and processing the image to provide a camera quaternion, step 704. Method 700 also includes acquiring an angular rate output from a gyroscope system, step 706, and processing the angular rate output to provide a gyroscope quaternion, step 708. Method 700 further includes resolving the gyroscope quaternion and the star camera quaternion to provide an attitude quaternion for the aerospace vehicle, step 710.

In accordance with the subject invention, the APS star camera may include wide field-of-view (FOV) large aperture optics to allow more stars of sufficiently bright magnitude to be imaged. For example, in a APS star camera, a 21 degree FOV lens with a 35 mm focal length and an F# of 1.2, with star field images defocused to 1.5 pixels Full-Width Half Maximum (FWHM) would be suitable and allows for interpolation of star centroids to approximately $\frac{1}{10}^{th}$ of a pixel. A STAR250 APS designed and built by Fill Factory of Mechelen, Belgium for the European Space Agency's ASCoSS (Attitude Sensor Concepts for Small Satellites) project, with ability to detect stars of magnitude 5 or brighter (which may give a reliable attitude solution over 99.5% of the sky) is one such APS star camera appropriate for use with the present invention, although the invention is not limited to such settings or to any particular APS star camera. A CCD may be used, however, the CCD will have the limitations discussed and thus decrease the effectiveness of the subject invention.

Also in accordance with the subject invention, MEMs gyroscope system may include a TFG14-R3, 20-μm thick sensor fabricated in a silicon-on-insulator process, with such process described in U.S. patent application Ser. No. 10/264,887, PCT Patent Application WO 03/03912A2, and U.S. patent application Ser. No. 5,349,855 each of which is hereby incorporated herein in its entirety by reference.

The ASICs that may be used with the subject invention include Gyro ASIC 4 application specific integrated circuits. MEMs gyroscope 34 is one appropriate gyroscope for use with the present invention, although the invention is not limited to a MEMs gyroscope or to any particular MEMs gyroscope. Flight computer 18 may include a single-board computer developed by The Charles Stark Draper Laboratory, Inc. of Cambridge, Mass., as described in Brady, T., et al. "The Inertial Stellar Compass: A New Direction in Spacecraft Attitude Determination", 16$^{th}$ Annual AIAA/USU Conference on Small Satellites, Logan, Utah, 12–15 Aug. 2002, built around the ERC32, a commercially available low-power embedded processor from Atmel Wireless and Microcontroller Corporation. Flight computer 18 may interface with the host spacecraft via a 15-pin RS422 interface. The Draper single-board computer, the ERC32, and the RS422 interface are examples of available hardware components for use in flight computer of the present invention, although the invention is not limited to any of these components, and may be used with other computers, processors and interfaces.

Figure 19:
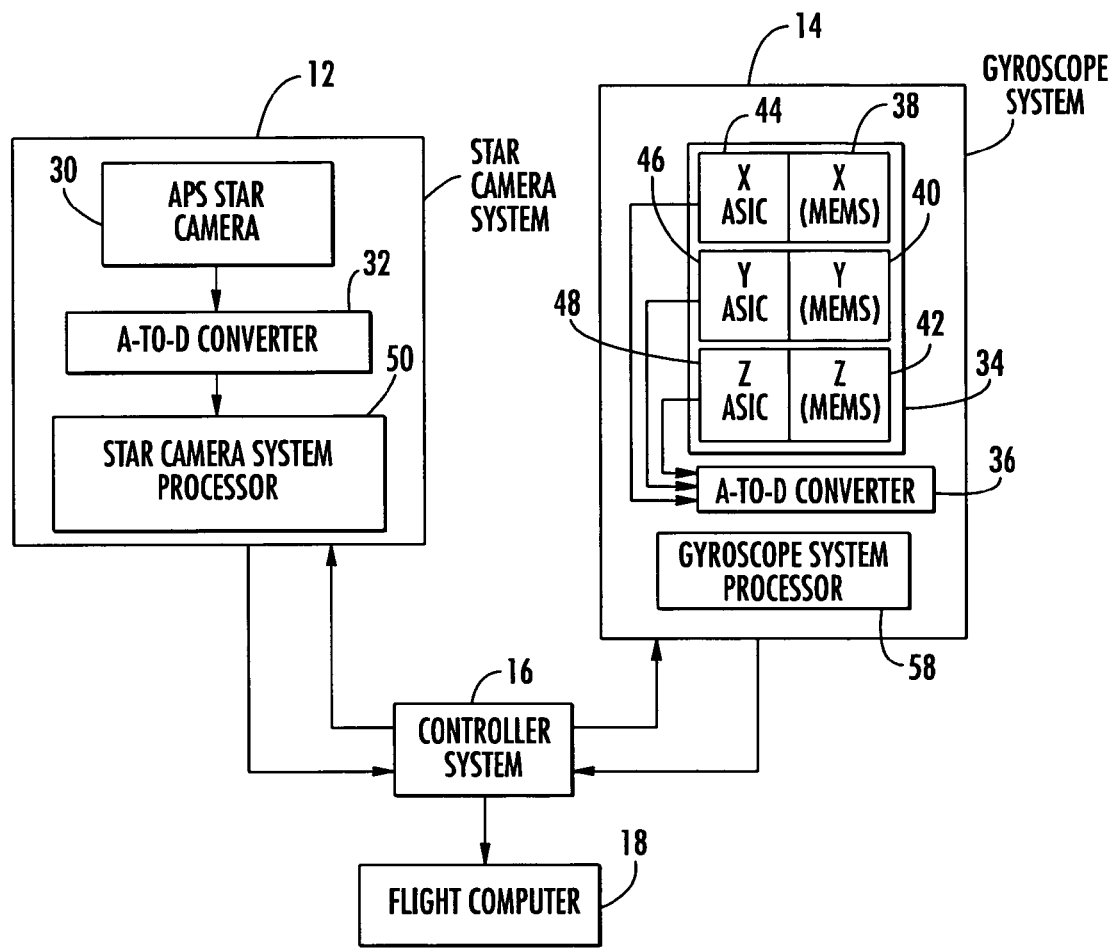
FIG. 19 is a schematic block diagram of a star camera system, gyroscope system and flight computer according to another embodiment of the invention.

Additionally, although specific components of the integrated inertial stellar attitude sensor of the subject invention are shown and discussed, it will be understood by those skilled in the art that such components are not to be taken as the only possible components or combination of components, and that the invention encompasses other combinations and embodiments such as the embodiment shown in FIG. 19 where the star camera system processor is part of the star camera system, and the gyroscope system processor is part of the gyroscope system, rather than having these components as part of the flight computer. Other variations and arranging of components may occur to those skilled in the art while still coming within the penumbra of the subject invention.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An integrated inertial stellar attitude sensor for an aerospace vehicle comprising:
   a star camera system;
   a gyroscope system;
   a controller system for synchronously integrating an output of said star camera system and an output of said gyroscope system into a stream of data; and
   a flight computer responsive to said stream of data for determining from the star camera system output and the gyroscope system output the attitude of the aerospace vehicle.

2. The integrated inertial stellar attitude sensor of claim 1 in which the star camera system includes an active pixel sensor (APS) star camera for acquiring a star field image.

3. The integrated inertial stellar attitude sensor of claim 2 in which the star camera system includes a star camera analog-to-digital converter structured and arranged to convert the star field image to a digital representation of star location and intensity.

4. The integrated inertial stellar attitude sensor of claim 2 in which the gyroscope system includes a micro-electromechanical (MEMs) gyroscope system structured and arranged to acquire gyroscope angular rate data.

5. The integrated inertial stellar attitude sensor of claim 4 in which the gyroscope system includes a gyroscope analog-to-digital converter structured and arranged to convert the gyroscope angular rate data to a digital representation of gyroscope angular rate.

6. The integrated inertial stellar attitude sensor of claim 4 in which the stream of digital data is a digital data stream.

7. The integrated inertial stellar attitude sensor of claim 6 wherein the digital representation of the gyroscope angular rate includes gyroscope system reference, rate and temperature.

8. The integrated inertial stellar attitude sensor of claim 7 in which the MEMs gyroscope system is a three axis gyroscope system.

9. The integrated inertial stellar attitude sensor of claim 8 in which the MEMs gyroscope system includes a first axis sensor for sensing angular rate along a first axis.

10. The integrated inertial stellar attitude sensor of claim 9 in which the MEMs gyroscope system includes a second axis sensor for sensing angular rate along a second axis.

11. The integrated inertial stellar attitude sensor of claim 10 in which the MEMs gyroscope system includes a third axis sensor for sensing angular rate along a third axis.

12. The integrated inertial stellar attitude sensor of claim 11 in which the MEMs gyroscope system includes a first application specific integrated circuit (ASIC) associated with the first axis sensor for outputting a first signal.

13. The integrated inertial stellar attitude sensor of claim 12 in which the MEMs gyroscope system includes a second application specific integrated circuit (ASIC) associated with the second axis sensor for outputting a second signal.

14. The integrated inertial stellar attitude sensor of claim 13 in which the MEMs gyroscope system includes a third application specific integrated circuit (ASIC) associated with the third axis sensor for outputting a third signal.

15. The integrated inertial stellar attitude sensor of claim 14 in which the controller system includes a field programmable gate array.

16. The integrated inertial stellar attitude sensor of claim 15 in which the field programmable gate array includes a command circuit for selectively synchronously integrating the outputs of said gyroscope system and said star camera system in a predetermined pattern to isolate from each other each of their outputs during their integrating.

17. The integrated inertial stellar attitude sensor of claim 16 in which the command circuit includes a programmable logic device for implementing said selective synchronous integration of the outputs of said gyroscope system and said star camera system in a predetermined pattern.

18. The integrated inertial stellar attitude sensor of claim 17 in which the command circuit includes at least one camera register for setting star camera rate of image acquisition and star camera power.

19. The integrated inertial stellar attitude sensor of claim 18 in which the command circuit includes a camera control device responsive to the camera register settings for controlling the star camera the camera.

20. The integrated inertial stellar attitude sensor of claim 18 in which the command circuit includes at least one gyroscope register for setting gyroscope power and a gyroscope reference.

21. The integrated inertial stellar attitude sensor of claim 18 in which the command circuit includes a gyroscope control device responsive to the gyroscope register settings for controlling the gyroscope.

22. The integrated inertial stellar attitude sensor of claim 21 in which the command circuit includes a data stream packer for interleaving the output of the star camera system and the output of the gyroscope system into the stream of data.

23. The integrated inertial stellar attitude sensor of claim 22 in which the gyroscope control device controls when the gyroscope system may receive gyroscope data.

24. The integrated inertial stellar attitude sensor of claim 23 in which the command circuit includes a power isolation and control circuit.

25. The integrated inertial stellar attitude sensor of claim 24 in which the power isolation and control circuit includes a power isolator for isolating star camera power from gyroscope power.

26. The integrated inertial stellar attitude sensor of claim 25 in which at least one gyroscope register sets when the power isolation circuit may receive a signal to transmit gyroscope power to the gyroscope system.

27. The integrated inertial stellar attitude sensor of claim 26 in which the flight computer includes a star camera system processor.

28. The integrated inertial stellar attitude sensor of claim 27 in which the star camera system processor includes a camera memory for storing the star field image.

29. The integrated inertial stellar attitude sensor of claim 28 in which the star camera system processor includes an image processor.

30. The integrated inertial stellar attitude sensor of claim 29 in which the image processor includes a camera reader for reading the stored star field image.

31. The integrated inertial stellar attitude sensor of claim 30 in which the image processor includes a camera processor for generating star positions from the read star field image.

32. The integrated inertial stellar attitude sensor of claim 31 in which the image processor includes a star catalog.

33. The integrated inertial stellar attitude sensor of claim 32 in which the image processor includes a camera comparator for comparing the generated star positions to a star catalog.

34. The integrated inertial stellar attitude sensor of claim 33 in which the image processor includes a camera attitude generator responsive to an output from the camera comparator for generating a star camera attitude.

35. The integrated inertial stellar attitude sensor of claim 31 in which camera processor includes a converter for converting the attitude of the aerospace vehicle to an initial star position.

36. The integrated inertial stellar attitude sensor of claim 34 in which the flight computer includes a gyroscope system processor.

37. The integrated inertial stellar attitude sensor of claim 36 in which the gyroscope system processor includes a gyroscope memory for storing the gyroscope angular rate data.

38. The integrated inertial stellar attitude sensor of claim 37 in which the gyroscope system processor includes a gyroscope rate processor.

39. The integrated inertial stellar attitude sensor of claim 38 in which the gyroscope rate processor includes a gyroscope data reader for reading the stored gyroscope angular rate data.

40. The integrated inertial stellar attitude sensor of claim 39 in which the gyroscope rate processor includes a gyroscope compensator for processing gyroscope angular rate data and generating a compensated gyroscope rate.

41. The integrated inertial stellar attitude sensor of claim 40 in which the gyroscope rate processor includes a gyroscope integrator for integrating the compensated gyroscope rate and generating a gyroscope attitude.

42. The integrated inertial stellar attitude sensor of claim 41 in which the flight computer further includes an attitude processor for receiving and processing the star camera attitude and the gyroscope attitude.

43. The integrated inertial stellar attitude sensor of claim 42 in which the attitude processor includes an aerospace vehicle attitude propagator for propagating the attitude of the aerospace vehicle.

44. The integrated inertial stellar attitude sensor of claim 43 in which the attitude processor provides the attitude of the aerospace vehicle in quaternion coordinates.

45. The integrated inertial stellar attitude sensor of claim 44 in which the attitude processor includes an error estimator for estimating aerospace vehicle attitude error.

46. The integrated inertial stellar attitude sensor of claim 45 in which the attitude propagator and the error estimator are implemented by a predictive filter.

47. The integrated inertial stellar attitude sensor of claim 46 in which the predictive filter is a Kalman Filter.

48. The integrated inertial stellar attitude sensor of claim 47 in which the Kalman Filter is a square root Kalman Filter.

49. The integrated inertial stellar attitude sensor of claim 47 in which the Katman Filter is a 27 state Kairnan Filter.

50. The integrated inertial stellar attitude sensor of claim 49 in which the attitude processor includes a gyroscope attitude gating device for preventing the attitude processor from receiving the gyroscope attitude upon power up of the integrated inertial stellar attitude sensor.

51. The integrated inertial stellar attitude sensor of claim 49 in which the flight computer includes a command control data interface.

52. The integrated inertial stellar attitude sensor of claim 51 in which the command control data interface includes a serial port for reformatting a signal representing the attitude of the aerospace vehicle and a signal representing the aerospace vehicle attitude error signal.

53. The integrated inertial stellar attitude sensor of claim 51 in which the command control data interface includes a counter for counting the number of times the attitude of the aerospace vehicle has been propagated.

54. The integrated inertial stellar attitude sensor of claim 53 in which the command control data interface includes a command processor for distributing commands based on command type.

55. The integrated inertial stellar attitude sensor of claim 54 in which the controller system includes an isolation circuit for isolating said stream of data from commands distributed by the command processor.

56. The integrated inertial stellar attitude sensor of claim 55 in which the flight computer further includes a self-scoring system to identify error trends in the aerospace vehicle attitude.

57. The integrated inertial stellar attitude sensor of claim 55 in which the self-scoring system includes an enabler for enabling the self-scoring system.

58. The integrated inertial stellar attitude sensor of claim 57 in which the enabler generates a self-score continuous frequency command to the command control data interface to increase the star camera rate of star field image acquisition to continuous frequency.

59. The integrated inertial stellar attitude sensor of claim 58 in which the self-scoring system includes a first comparator for comparing a continuous frequency star camera attitude over time with the attitude of the aerospace vehicle over time and providing a self-score error output.

60. The integrated inertial stellar attitude sensor of claim 59 in which the self-scoring system includes a second comparator for comparing said self-score error output to a desired error threshold value and providing a threshold departure output.

61. The integrated inertial stellar attitude sensor of claim 60 in which the self-scoring system includes an error processor which outputs a self-score command to the command control data interface to increase the frequency of star field image acquisition.

62. The integrated inertial stellar attitude sensor of claim 61 in which the attitude processor further includes a star camera self-initializing device for providing the attitude of the aerospace vehicle to the image processor.

63. The integrated inertial stellar attitude sensor of claim 62 in which the attitude processor further includes a gyroscope self-initializing device for providing the star camera attitude to the aerospace vehicle attitude propagator.

64. The integrated inertial stellar attitude sensor of claim 1 in which the output of the star camera system is a star camera attitude.

65. The integrated inertial stellar attitude sensor of claim 1 in which the output of the gyroscope system is a gyroscope attitude.

66. An integrated inertial stellar attitude sensor for an aerospace vehicle comprising:
 a star camera system;
 a gyroscope system;
 a controller system for synchronously integrating an attitude output of said star camera system and an attitude output of said gyroscope system into a stream of data; and
 a flight computer responsive to said stream of data for determining from the star camera attitude output and the gyroscope system attitude output the attitude of the aerospace vehicle.

67. An inertial stellar attitude determination sensor for an aerospace vehicle comprising:
 a star camera system including an active pixel sensor star camera;
 a gyroscope system including a micro-electromechanical gyroscope;
 a controller system for synchronously integrating an output of the active pixel sensor star camera and an output of the micro-electromechanical gyroscope into a stream of digital data; and
 a flight computer responsive to said stream of digital data for determining from the active pixel sensor star camera output and the gyroscope output the attitude of the aerospace vehicle.

68. An inertial stellar attitude determination sensor for an aerospace vehicle comprising:
 a star camera system including an active pixel sensor star camera;
 a gyroscope system including a micro-electromechanical gyroscope; and
 a controller system for synchronously integrating an output of the active pixel sensor star camera and an output of the gyroscope into a stream of data.

69. An inertial stellar attitude determination sensor for an aerospace vehicle comprising:
 an active pixel sensor star camera;
 a micro-electromechanical gyroscope integral with the active pixel sensor star camera;
 a controller system integral with the active pixel sensor star camera and the micro-electromechanical gyroscope for synchronously integrating an attitude output of the active pixel sensor star camera and an attitude output of the gyroscope into a stream of data; and
 a flight computer responsive to said stream of data for determining from the active pixel sensor star camera attitude output and the gyroscope attitude output the attitude of the aerospace vehicle.

70. An integrated inertial stellar attitude sensor for an aerospace vehicle comprising:
 a star camera system;
 a gyroscope system;
 a controller system for synchronously integrating an output of said star camera system and an output of said gyroscope system into a stream of data;
 a flight computer responsive to said stream of data for determining from the star camera output and the gyroscope output the attitude of the aerospace vehicle; and
 a single housing disposed about the star camera system, the gyroscope system, the controller system and the flight computer.

71. An integrated inertial stellar attitude sensor for an aerospace vehicle comprising:
 a star camera system;
 a gyroscope system;
 a controller system for synchronously integrating an output of said star camera system and an output of said gyroscope system into a stream of data; and
 a single housing disposed about the star camera system, the gyroscope system, and the controller system.

72. A integrated inertial stellar attitude sensor for an aerospace vehicle comprising:
- a camera/gyroscope assembly including:
  - a star camera system;
  - a gyroscope system; and
  - a controller system for synchronously integrating an output of said star camera system and an output of said gyroscope system into a stream of data; and
- a flight computer responsive to said stream of data for determining from the star camera output and the gyroscope output the attitude of the aerospace vehicle.

73. The integrated inertial stellar attitude sensor of claim 72 including a first housing disposed about the camera/gyroscope assembly.

74. The integrated inertial stellar attitude sensor of claim 73 including a second housing disposed about the flight computer.

75. The integrated inertial stellar attitude sensor of claim 74 including a third housing disposed about the first and second housings.

76. An integrated inertial stellar attitude sensor for an aerospace vehicle comprising:
- a star camera system;
- a gyroscope system;
- a controller system for synchronously integrating an output of said star camera system and an output of said gyroscope system into a stream of data;
- a flight computer responsive to said stream of data for determining from the star camera output and the gyroscope output the attitude of the aerospace vehicle;
- a first housing disposed about the star camera system and the gyroscope system;
- a second housing disposed about the controller and the flight computer; and
- a third housing disposed about the first and second housings.

77. An inertial stellar attitude determination sensor for an aerospace vehicle comprising:
- an active pixel sensor (APS) star camera;
- a micro-electromechanical (MEMs) gyroscope;
- a controller system for synchronously integrating the output of the active pixel sensor (APS) star camera and the output of the micro-electromechanical (IvIEMs) gyroscope into a stream of data;
- a flight computer responsive to said stream of data for determining from the active pixel sensor (APS) star camera output and the micro-electromechanical (MEMs) gyroscope output the attitude of the aerospace vehicle; and
- a housing disposed about the active pixel sensor (APS) star camera and the micro-electromechanical (MEMs) gyroscope and the flight computer.

78. An integrated inertial stellar attitude sensor for an aerospace vehicle comprising:
- a star camera system;
- a gyroscope system;
- a controller system for selectively synchronously integrating an output of said star camera system and an output of said gyroscope system in a predetermined pattern into a stream of data, said controller system including a command circuit for isolating from each other each of said star camera system output and said gyroscope system output during their integrating; and
- a flight computer responsive to said stream of data for determining from the star camera output and the gyroscope output the attitude of the aerospace vehicle.

79. An integrated inertial stellar attitude sensor for an aerospace vehicle comprising:
- a star camera system;
- a gyroscope system;
- a controller system for synchronously integrating an output of said star camera system and an output of said gyroscope system into a stream of data, said controller system including a data stream packer for interleaving said output of the star camera system and said output of the gyroscope system into the stream of data; and
- a flight computer responsive to said stream of data for determining from the star camera output and the gyroscope output the attitude of the aerospace vehicle.

80. A self-initializing integrated inertial stellar attitude sensor for an aerospace vehicle comprising:
- a star camera system;
- a gyroscope system;
- a controller system for synchronously integrating an output of said star camera system and an output of said gyroscope system into a stream of data; and
- a flight computer responsive to said stream of data for determining from the star camera output and the gyroscope output the attitude of the aerospace vehicle, said flight computer including a star camera self-initializing device for self-initializing the star camera system with the attitude of the aerospace vehicle.

81. An integrated inertial stellar attitude sensor for an aerospace vehicle comprising:
- a star camera system;
- a gyroscope system;
- a controller system for synchronously integrating an output of said star camera system and an output of said gyroscope system into a stream of data; and
- a flight computer responsive to said stream of data for determining from the star camera output and the gyroscope output the attitude of the aerospace vehicle, the flight computer further including a self-scoring system to identify error trends in the aerospace vehicle attitude.

82. An integrated inertial stellar attitude sensor for an aerospace vehicle comprising:
- a star camera system;
- a gyroscope system; and
- a controller system for synchronously integrating an output of said star camera system and an output of said gyroscope system into a stream of data adapted for input to a flight computer to determine the attitude of the aerospace vehicle.

83. A method of inertial stellar attitude sensing for an aerospace vehicle comprising:
- acquiring an image of a star field output from a star camera system;
- acquiring an angular rate output from a gyroscope system;
- selectively, synchronously integrating in a predetermined pattern the image of a star field output and the gyroscope angular rate output into a stream of data;
- converting the data representative of the star field to a star field image to determined the star camera attitude of the vehicle;
- converting the data representative of the angular rate output to determined the gyroscope attitude of the vehicle; and
- resolving the star camera attitude with the gyroscope attitude to generate an attitude of the aerospace vehicle.

84. The method of claim 83 in which said star camera system includes an active pixel sensor (APS) camera.

85. The method of claim 84 in which said gyroscope system includes a micro-electromechanical (MEMs) gyroscope system.

86. The method of claim 85 in which said gyroscope system is a three axis system.

87. The method of claim 86 including selectively synchronously integrating the outputs of the gyroscope system and the star camera system in a predetermined pattern to isolate from each other each of the star camera system and gyroscope system outputs during their integrating.

88. The method of claim 87 in which resolving the star camera attitude with the gyroscope attitude includes submitting the star camera attitude and the gyroscope attitude to an attitude processor to obtain the aerospace vehicle attitude.

89. The method of claim 88 further including applying the attitude of the aerospace vehicle to self-initialize the star camera attitude.

90. The method of claim 89 further including applying the star camera attitude to self-initialize the gyroscope system attitude.

91. The method of claim 90 further including increasing the frequency of star field image acquisition to continuous frequency and determining continuous frequency attitude outputs over time, and comparing the attitude output of the aerospace vehicle over time to the continuous frequency attitude output over time to identify error trends in the aerospace vehicle attitude.

92. A method of inertial stellar attitude sensing for an aerospace vehicle comprising:
acquiring a star camera attitude from a star camera system;
acquiring a gyroscope attitude from a gyroscope system;
selectively, synchronously integrating in a predetermined pattern the star camera attitude and the gyroscope attitude into a stream of data; and
resolving the star camera attitude with the gyroscope attitude to generate an attitude for the aerospace vehicle.

93. A method of inertial stellar attitude sensing for an aerospace vehicle comprising:
acquiring an image of a star field output from a star camera system;
acquiring an angular rate output from a gyroscope system;
selectively, synchronously integrating in a predetermined pattern the image of a star field output and the angular rate output into a stream of data;
converting the data representative of the star field within the stream to a star field image to determine the star camera attitude of the vehicle;
converting the data representative of the angular rate within the stream to determine the gyroscope attitude of the vehicle;
resolving the star camera attitude with the gyroscope attitude to generate an attitude for the aerospace vehicle; and
increasing the frequency of star field image acquisition to continuous frequency and determining continuous frequency star camera attitude outputs over time, and comparing the attitude output of the aerospace vehicle over time to the continuous frequency attitude output of the star camera system over time to identify error trends in the aerospace vehicle attitude.

94. A method of inertial stellar attitude sensing for an aerospace vehicle comprising:
acquiring an image of a star field output from a star camera system;
acquiring an angular rate output from a gyroscope system;
selectively, synchronously integrating in a predetermined pattern the image of a star field and the gyroscope angular rate into a stream of data;
converting the data representative of the star filed within the stream to a star field image to determine the star camera attitude of the vehicle;
converting the data representative of the angular rate within the stream to determine the gyroscope attitude of the vehicle;
resolving the star camera attitude with the gyroscope attitude to generate an attitude for the aerospace vehicle; and
changing said predetermined pattern of selectively synchronously integrating.

95. A method of inertial stellar attitude sensing for an aerospace vehicle comprising:
acquiring an image of a star field output from a star camera system;
acquiring an angular rate output from a gyroscope system;
selectively, synchronously integrating in a predetermined pattern the image of a star field output and the gyroscope angular rate output into a stream of data;
converting the data representative of the star field to a star field image to determined the star camera attitude of the vehicle;
converting the data representative of the angular rate output to determined the gyroscope attitude of the vehicle;
resolving the star camera attitude with the gyroscope attitude to generate an attitude of the aerospace vehicle; and
increasing the frequency of star field image acquisition to continuous frequency and determining continuous frequency attitude outputs over time, and comparing the attitude output of the aerospace vehicle over time to the continuous frequency attitude output over time to identify error trends in the aerospace vehicle attitude.

96. An integrated inertial stellar attitude sensor for an aerospace vehicle comprising:
a star camera system;
a gyroscope system;
a controller system for synchronously integrating an output of said star camera system and an output of said gyroscope system into a stream of data; and
a flight computer responsive to said stream of data for determining from the star camera system output and the gyroscope system output the attitude of the aerospace vehicle, the flight computer including an attitude processor which includes a gyroscope attitude gating device for preventing the attitude processor from receiving gyroscope attitude upon power up of the integrated inertial stellar attitude sensor.

97. An integrated inertial stellar attitude sensor for an aerospace vehicle comprising:
a star camera system;
a gyroscope system;
a controller system for synchronously integrating an output of said star camera system and an output of said gyroscope system into a stream of data; and
a flight computer responsive to said stream of data for determining from the star camera system output and the gyroscope system output the attitude of the aerospace vehicle, the flight computer including a command control data interface which includes a counter for counting the number of times the attitude of the aerospace vehicle has been propagated.

98. The integrated inertial stellar attitude sensor of claim 97 in which the command control data interface includes a command processor for distributing commands based on command type.

99. The integrated inertial stellar attitude sensor of claim 98 in which the controller system includes an isolation circuit for isolating said stream of data from commands distributed by the command processor.

100. An integrated inertial stellar attitude sensor for an aerospace vehicle comprising:
- a star camera system;
- a gyroscope system;
- a controller system for synchronously integrating an output of said star camera system and an output of said gyroscope system into a stream of data; and
- a flight computer responsive to said stream of data for determining from the star camera system output and the gyroscope system output the attitude of the aerospace vehicle, the flight computer including a self-scoring system to identify error trends in the aerospace vehicle attitude.

101. The integrated inertial stellar attitude sensor of claim 100 in which the self-scoring system includes an enabler for enabling the self-scoring system.

102. The integrated inertial stellar attitude sensor of claim 101 in which the enabler generates a self-score continuous frequency command to the command control data interface to increase the star camera rate of star field image acquisition to continuous frequency.

103. The integrated inertial stellar attitude sensor of claim 102 in which the self-scoring system includes a first comparator for comparing a continuous frequency star camera attitude over time with the attitude of the aerospace vehicle over time and providing a self-score error output.

104. The integrated inertial stellar attitude sensor of claim 103 in which the self-scoring system includes a second comparator for comparing said self-score error output to a desired error threshold value and providing a threshold departure output.

105. The integrated inertial stellar attitude sensor of claim 104 in which the self-scoring system includes an error processor which outputs a self-score command to the command control data interface to increase the frequency of star field image acquisition.

106. The integrated inertial stellar attitude sensor of claim 105 in which the attitude processor further includes a star camera self-initializing device for providing the attitude of the aerospace vehicle to an image processor.

107. The integrated inertial stellar attitude sensor of claim 106 in which the attitude processor further includes a gyroscope self-initializing device for providing the star camera attitude to an aerospace vehicle attitude propagator.

108. A integrated inertial stellar attitude sensor for an aerospace vehicle comprising:
- a camera/gyroscope assembly including:
  - a star camera system,
  - a gyroscope system, and
  - a controller system for synchronously integrating an output of said star camera system and an output of said gyroscope system into a stream of data;
- a first housing disposed about the camera/gyroscope assembly; and
- a flight computer responsive to said stream of data for determining from the star camera output and the gyroscope output the attitude of the aerospace vehicle.

109. The integrated inertial stellar attitude sensor of claim 108 including a second housing disposed about the flight computer.

110. The integrated inertial stellar attitude sensor of claim 109 including a third housing disposed about the first and second housings.

* * * * *